(12) United States Patent
Takahashi et al.

(10) Patent No.: US 7,796,772 B2
(45) Date of Patent: Sep. 14, 2010

(54) FLAT PANEL DISPLAY APPARATUS, STAND AND SPEAKER APPARATUS

(75) Inventors: Masahiro Takahashi, Saitama (JP); Hitoshi Takahashi, Kanagawa (JP); Hiroyoshi Maeda, Saitama (JP); Eiji Amaya, Kanagawa (JP); Masayasu Watanabe, Tokyo (JP)

(73) Assignee: Sony Corporation (JP)

( * ) Notice: Subject to any disclaimer, the term of this patent is extended or adjusted under 35 U.S.C. 154(b) by 1469 days.

(21) Appl. No.: 11/174,374

(22) Filed: Jul. 1, 2005

(65) Prior Publication Data

US 2006/0008103 A1 Jan. 12, 2006

(30) Foreign Application Priority Data

| Jul. 12, 2004 | (JP) | ............................. P2004-205209 |
| Jul. 12, 2004 | (JP) | ............................. P2004-205210 |
| Jul. 12, 2004 | (JP) | ............................. P2004-205212 |
| Sep. 14, 2004 | (JP) | ............................. P2004-267376 |
| Sep. 14, 2004 | (JP) | ............................. P2004-267377 |

(51) Int. Cl.
*H04R 1/02* (2006.01)
*H04R 9/06* (2006.01)
*G06F 1/16* (2006.01)

(52) U.S. Cl. ....................... 381/333; 381/388; 381/306; 361/679.23

(58) Field of Classification Search ................. 381/306, 381/333, 386–388, 87; 361/679.02, 0.21, 361/0.22, 0.23, 678, 682, 683, 679.03–679.07, 361/0.55, 0.61; 248/917–920

See application file for complete search history.

(56) References Cited

U.S. PATENT DOCUMENTS

| 5,978,211 | A  | * | 11/1999 | Hong .................... 361/679.23 |
| 6,229,584 | B1 | * | 5/2001  | Chuo et al. ................... 349/58 |
| 6,359,994 | B1 | * | 3/2002  | Markow et al. ............. 381/333 |
| 6,381,125 | B1 | * | 4/2002  | Mizoguchi et al. ...... 361/679.08 |
| 6,411,271 | B1 | * | 6/2002  | Bang et al. ..................... 345/87 |
| 6,603,859 | B1 | * | 8/2003  | Asano ......................... 381/59 |

(Continued)

FOREIGN PATENT DOCUMENTS

JP 59-81163 U 6/1984

(Continued)

OTHER PUBLICATIONS

Japanese Office Action issued on Aug. 21, 2008 in corresponding Japanese Application No. 2004-205209.

*Primary Examiner*—Xu Mei
(74) *Attorney, Agent, or Firm*—Lerner, David, Littenberg, Krumholz & Mentlik, LLP

(57) ABSTRACT

A stand on which a flat panel display main body is placed has low-pitched sound speakers built therein and a speaker of the flat panel display main body and the low-pitched sound speakers of the stand are combined together to construct a powerful sound system with large sound volume. The low-pitched sound speakers are located at the back side of the flat panel display main body when the flat panel display main body is placed on the stand. In a flat panel display apparatus composed of the flat panel display main body having the speaker built therein and the stand supporting this flat panel display main body thereon, it is possible to easily realize a powerful sound system using the low-pitched sound speakers (woofers) without requiring any extra space.

13 Claims, 22 Drawing Sheets

U.S. PATENT DOCUMENTS

| | | |
|---|---|---|
| 6,702,604 B1 | 3/2004 | Moscovitch et al. |
| 6,798,654 B2 * | 9/2004 | Chang et al. ............ 361/679.23 |
| 6,999,595 B2 * | 2/2006 | Anderson et al. ............ 381/333 |
| 7,164,576 B2 * | 1/2007 | Suprapmo et al. ...... 361/679.55 |
| 7,280,665 B2 * | 10/2007 | Tamura et al. ............... 381/333 |
| 2003/0185400 A1 * | 10/2003 | Yoshizawa et al. ............ 381/58 |
| 2006/0198545 A1 * | 9/2006 | Che et al. .................... 381/388 |
| 2007/0030993 A1 * | 2/2007 | Yun ............................ 381/388 |

FOREIGN PATENT DOCUMENTS

| | | | |
|---|---|---|---|
| JP | 60-184384 U | | 12/1985 |
| JP | 62-142478 A | | 6/1987 |
| JP | 3-34388 U | | 4/1991 |
| JP | 10-161552 A | | 6/1998 |
| JP | 11-196487 A | | 7/1999 |
| JP | 2001-119464 A | | 4/2001 |
| JP | 2001-268478 A | | 9/2001 |
| JP | 2001290559 | * | 10/2001 |
| JP | 2002-158944 A | | 5/2002 |
| JP | 2002-215270 A | | 7/2002 |
| JP | 2002-218358 A | | 8/2002 |
| JP | 2002-278413 A | | 9/2002 |
| JP | 2003-507768 A | | 2/2003 |
| JP | 2003-339087 A | | 11/2003 |
| JP | 2004-007389 A | | 1/2004 |
| KR | 99060273 A | * | 7/1999 |
| KR | 2002092709 A | * | 12/2002 |
| WO | WO-03/079718 A1 | | 9/2003 |

* cited by examiner

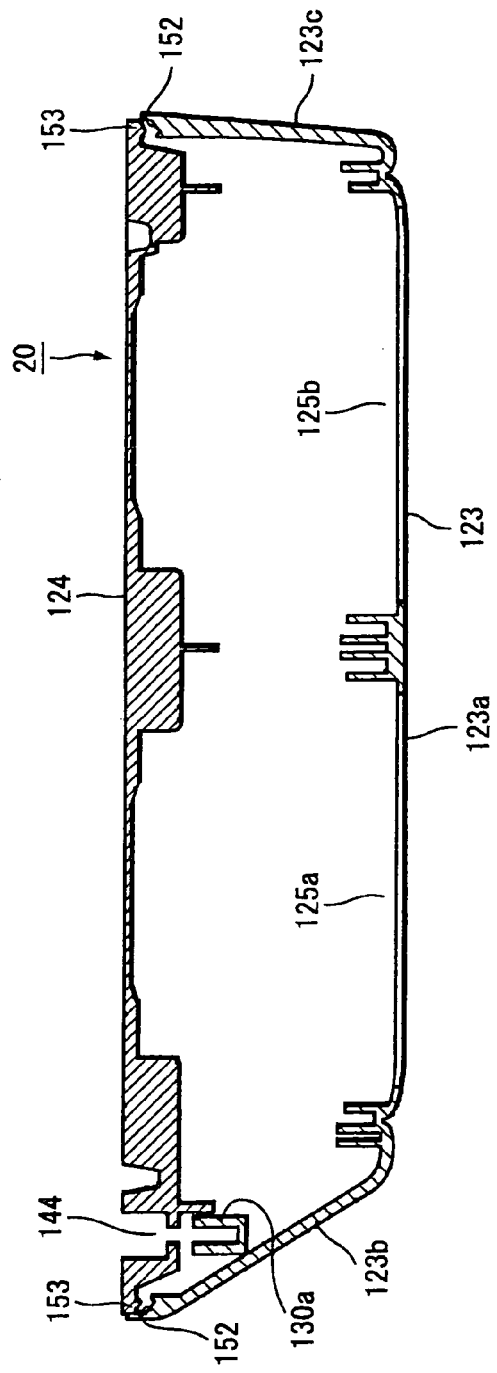
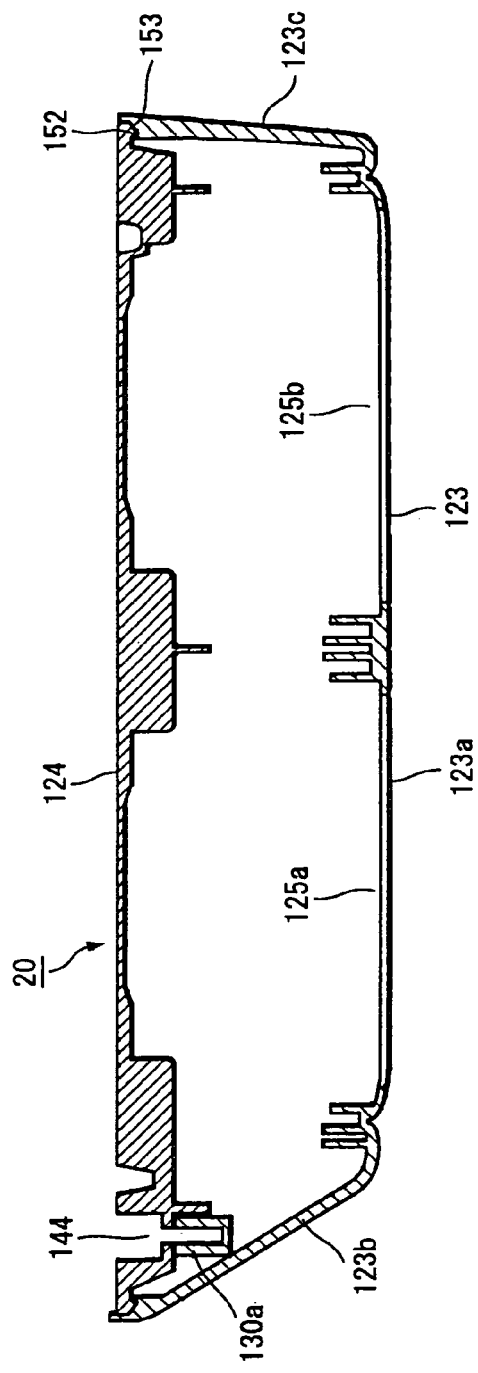
FIG. 17A
FIG. 17B

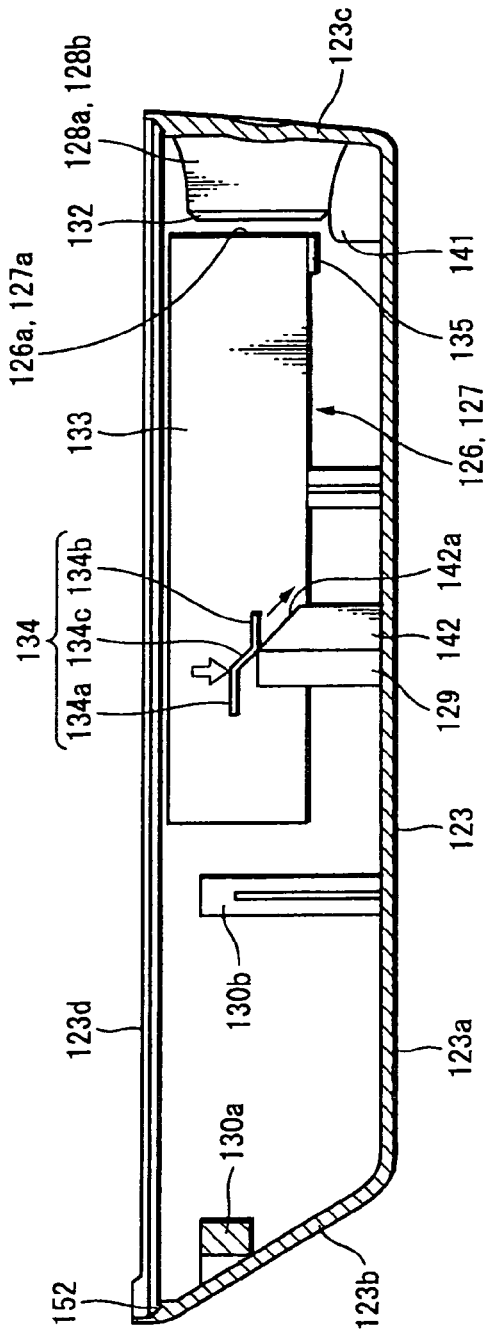
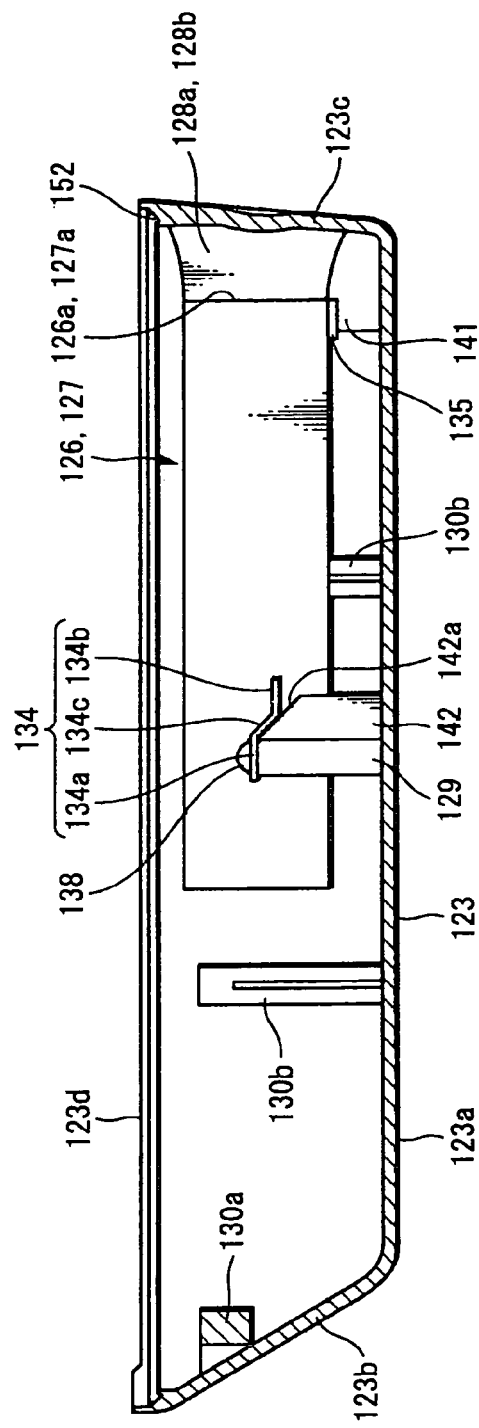
FIG. 21A
FIG. 21B

FLAT PANEL DISPLAY APPARATUS, STAND AND SPEAKER APPARATUS

CROSS-REFERENCE TO RELATED APPLICATIONS

The present application claims priority from Japanese Patent Application Nos. JP 2004-205210 filed on Jul. 12, 2004, JP 2004-205209 filed on Jul. 12, 2004, JP 2004-205212 filed on Jul. 12, 2004, JP 2004-267376 filed on Sep. 14, 2004, and JP 2004-267377 filed on Sep. 14, 2004, the disclosures of which are hereby incorporated by reference herein.

BACKGROUND OF THE INVENTION

The present invention relates to a flat panel display apparatus, a stand used by this flat panel display apparatus to support a flat panel display main body and a low-pitched sound speaker apparatus included in the flat panel display apparatus.

In recent years, a flat panel display apparatus using a liquid-crystal display and a plasma display is available as a thin image display apparatus.

This flat panel display apparatus prepares an exclusively-designed stand to place and support thereon a flat panel display main body. (See, for example, Official Gazette of Japanese Laid-open patent application No. 10-161552).

Also, recently, in this flat panel display apparatus, a low-pitched sound speaker (woofer) is prepared independently of a speaker built in the flat panel display main body, and this low-pitched sound speaker and the speaker built in the flat panel display main body are combined together to construct a sound system with a large sound volume.

In this case, since the low-pitched sound speaker is installed independently of the flat panel display apparatus, there is required an extra space for such low-pitched sound speaker. Also, a problem arises, in which it is cumbersome to select the place to install the low-pitched sound speaker.

SUMMARY OF THE INVENTION

In view of the aforesaid aspects, the present invention intends to provide a flat panel display apparatus in which a powerful sound system using a low-pitched sound speaker can be easily realized without requiring any extra space.

Further, the present invention intends to provide a stand and a speaker apparatus for use with such a flat panel display apparatus.

According to an aspect of the present invention, there is provided a flat panel display apparatus including a flat panel display main body having a front side including a display screen and a back side, the flat panel display main body including a speaker; and a stand supporting the flat panel display main body in a supported position, the stand including a woofer positioned at the back side of the flat panel display main body in the supported position.

According to another aspect of the present invention, there is provided a flat panel display apparatus including a flat panel display main body having a speaker; and a stand supporting the flat panel display main body in a supported position, the stand including a holder portion positioned below the flat panel display main body in the supported position, the holder portion having first and second ends, a pair of supports extending from the holder portion adjacent the first and second ends, and a speaker enclosure mounted between the supports, the speaker enclosure including a low-pitched sound speaker.

According to a further aspect of the present invention, there is provided a flat panel display apparatus including a flat panel display main body having a first connection portion; and a stand supporting the flat panel display main body in a supported position, the stand having a speaker built therein and a second connecting portion electrically connected to the speaker, the first connecting portion engaging the second connecting portion in the supported position to electrically connect the flat panel display main body to the speaker, one of the first and second connecting portions being constantly urged against another one of the first and second connecting portions by a resilient member.

According to a further aspect of the present invention, there is provided a flat panel display apparatus including a flat panel display main body having a speaker, a display screen and a first connecting portion; and a stand for supporting the flat panel display main body in a supported position, the stand including a low-pitched sound speaker and a second connecting portion electrically connected to the low-pitched sound speaker, the first connecting portion engaging the second connecting portion in the supported position to electrically connect the flat panel display main body to the low-pitched sound speaker. This flat panel display apparatus includes detecting means for detecting a connection mistake between the first connecting portion and the second connecting portion, wherein if a connection mistake is detected by the detecting means, a message indicative of the detected connection mistake is indicated on the display screen of the flat panel display main body.

According to yet a further aspect of the present invention, there is provided a flat panel display apparatus including a flat panel display main body; and a stand supporting the flat panel display main body in a supported position, the stand including an enclosure for a speaker and a slide mechanism for adjusting the position of the enclosure so that the position of the enclosure can be varied relative to the position of the flat panel display main body in the supported position.

In accordance with still a further aspect of the present invention, there is provided a speaker apparatus including a speaker enclosure having a base reflex duct and an opening portion at one end of the bass reflex duct; and a speaker mounted to the speaker enclosure along a first plane so as to radiate sound waves in a first direction; the opening portion extending in a plane perpendicular to the first plane, and the bass reflex duct extending in a direction perpendicular to the first direction.

According to the flat panel display apparatus of the present invention, the speaker of the flat panel display main body and the low-pitched sound speaker of the stand are combined together to complete a powerful sound system with a large sound volume. Particularly, according to the present invention, since the stand that supports the flat panel display main body has the low-pitched sound speaker built therein, it is possible to realize a sound system with a large sound volume without requiring any extra space. Further, since this low-pitched sound speaker is located at the optimum position of the back side of the flat panel display main body when the flat panel display main body is supported on the stand, it is possible to easily construct a sound system with a large sound volume without the cumbersome work of selecting the place to install the low-pitched sound speaker. Also, since this low-pitched sound speaker is located at the back side of the flat panel display main body, the outside appearance of the flat panel display apparatus can be made neat and simple on the whole as it is seen from the front.

Further, according to the present invention, since the stand on which the flat panel display main body is placed has supports extending along the back side thereof and the speaker enclosure having the low-pitched sound speaker therein is mounted between the supports, the speaker enclosure can be made large in size to increase its volume, whereby a more powerful sound system with a heavy low-pitched sound can be realized.

Further, according to the flat panel display apparatus of the present invention, since the display main body and the speaker are electrically connected with each other when the display main body is placed on the stand, the display main body and the speaker can be electrically connected with each other without the user's cumbersome connection work. In particular, according to the present invention, since the connecting portion of one side is constantly urged against the connecting portion of the other side under the spring force of a resilient member, a stable connected state can be maintained. As a result, even when the flat panel display apparatus is packed and transported in the state in which the display main body and the stand are combined with each other, the connecting portions can be prevented from being released from engagement due to causes such as vibrations in the transportation, and hence reliability in the connection can be guaranteed.

Further, according to the present invention, since a connection mistake which occurs when the flat panel display main body and the low-pitched sound speaker are not connected with each other correctly is detected and a message indicative of such connection mistake is indicated on the screen of the flat panel display main body, it is possible to avoid having a user continue to use the flat panel display apparatus without being conscious of the connection mistake, and hence the flat panel display apparatus can be used while its original sound performance can be demonstrated sufficiently.

Further, according to the present invention, since the position of the speaker enclosure can be slidably adjusted in response to the size of the flat panel display main body that is supported on the stand, when an external connection cord is connected to the terminal portion at the back side of the flat panel display main body, for example, the external connection cord can be smoothly connected to the terminal portion without being disturbed by the speaker enclosure. Also, the speaker enclosure can be adjusted so as to be located at the optimum position considering sound effects.

Furthermore, according to the speaker apparatus of the present invention, since an opening portion is formed in a plane perpendicular to the plane in which the speaker of the speaker enclosure is attached and a bass reflex duct connected to the opening portion extends in a direction perpendicular to the direction in which sound waves radiate from the speaker, the speaker enclosure can be decreased in thickness and hence it is possible to provide a speaker apparatus suitable for use with electronic equipment such as a flat panel display apparatus, the thickness of which is very strongly requested to be decreased.

BRIEF DESCRIPTION OF THE DRAWINGS

FIGS. 17A and 17B are respectively cross-sectional views showing the speaker enclosure, wherein FIG. 17A is a cross-sectional view showing the state presented before the lid is fitted into the enclosure main body and FIG. 17B is a cross-sectional view showing the state presented after the lid was fitted into the enclosure main body;

FIGS. 20A and 20B show a bass reflex duct located within the speaker enclosure; wherein FIG. 20A is a front view and FIG. 20B is a bottom view, respectively;

FIGS. 21A and 21B are cross-sectional views showing the speaker enclosure, wherein FIG. 21A is a cross-sectional view used to explain the state presented before the bass reflex duct is joined to the speaker enclosure main body and FIG. 21B is a cross-sectional view used to explain the state presented after the bass reflex duct was joined to the speaker enclosure main body, respectively;

FIG. 23A to 23C are respectively diagrams showing other examples of structures in which bass reflex ducts are located, wherein FIG. 23A is a diagram showing an example in which two bass reflex ducts are extended in the upper and lower direction and located across the speaker unit in a point symmetry fashion; FIG. 23B is a diagram showing an example in which two bass reflex ducts are extended in the right and left direction and located across the speaker unit in an axial symmetry fashion; and FIG. 23C is a diagram showing an example in which two bass reflex ducts are extended in the right and left direction and located across the speaker unit in a point symmetry fashion.

DETAILED DESCRIPTION

Embodiments of present invention will hereinafter be described in detail with reference to the drawings.

Figure 1:
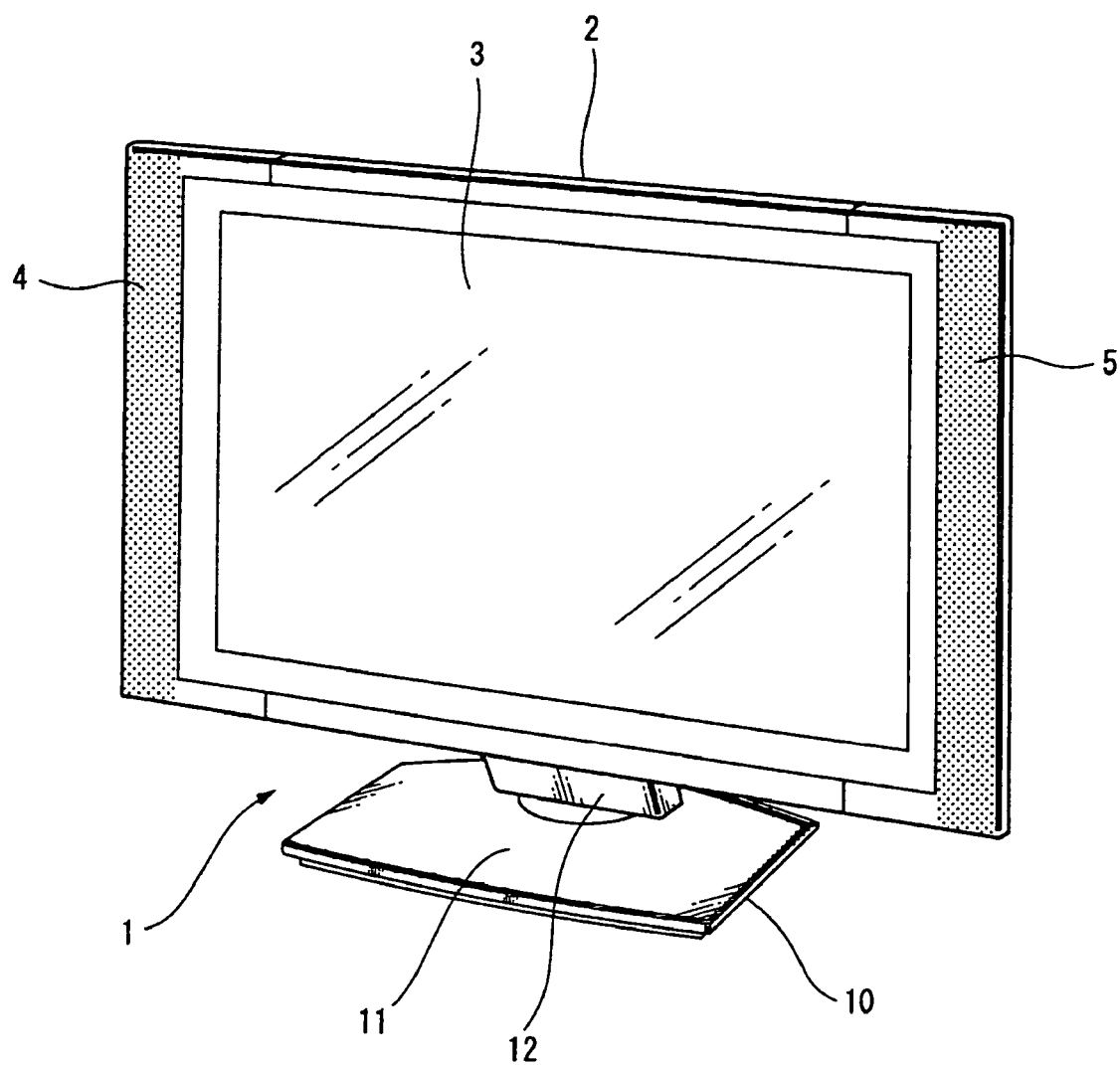
FIG. 1 is a perspective view showing a flat panel display apparatus from the front side.
Figure 2:
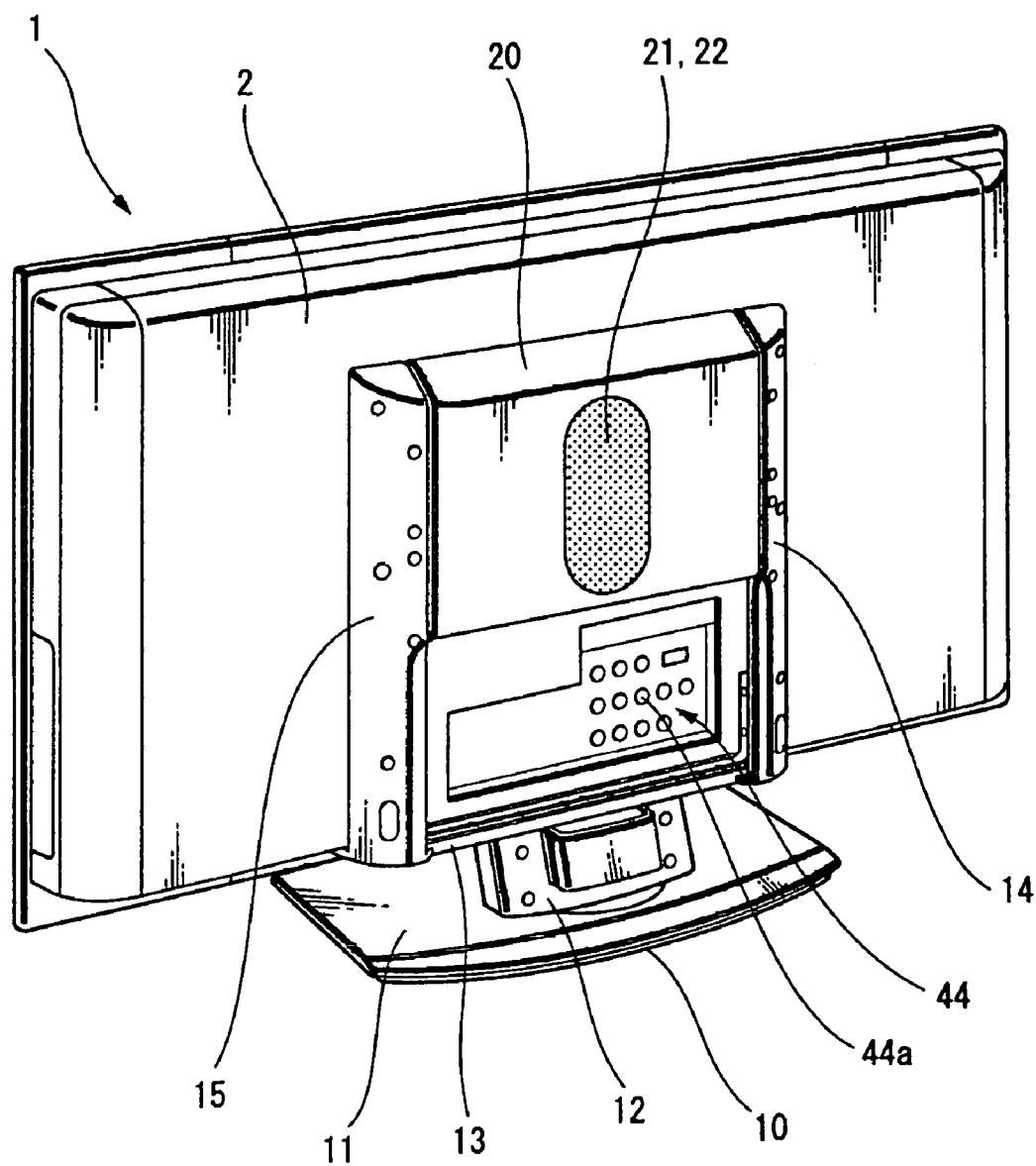
FIG. 2 is a perspective view showing a flat panel display apparatus from the back side.

FIG. 1 of the accompanying drawings is a perspective view showing a flat panel display apparatus according to the present invention from the front side and FIG. 2 is a perspective view showing the flat panel display apparatus according to the present invention from the back side.

As illustrated, this flat panel display apparatus 1 is composed of a flat panel display main body (hereinafter simply referred to as a "display main body") 2 and a stand 10 to support this display main body 2 thereon.

The display main body 2 has a large-size screen whose size fall within a range of from 37 to 50 inches provided on the front thereof. This display main body 2 is an ultra-thin type plasma display system television apparatus having a thickness of less than 10 cm. This display main body 2 has speakers 4 and 5 built in the left and right sides of the screen, and stereo sounds are emanated from the left and right speakers 4 and 5. The left and right speakers 4 and 5 of this display main body 2 are able to emanate mainly sounds of middle-pitched sound extent.

On the other hand, the stand 10 to support the display main body 2 thereon is composed of a base plate 11 in contact with the floor surface, a leg member 12 erected on the base plate 11 and a holder plate 13 horizontally fixed to the leg member 12, and the display main body 2 is placed on and supported to this holder plate 13 such that the display main body 2 may stand upright. Further, two supports 14 and 15 to support the back of the display main body 2 are extended in the vertical direction from both of right and left end portions of the holder plate 13 along the back side of the stand 10. The display main body 2 is fixed to the supports 14 and 15 by screws and thereby the display main body 2 is formed as one body with the stand 10.

In this stand 10, the leg portion 12 can be rotated in the left and right direction and it can also be inclined in the front and back direction relative to the base plate 11 upon adjustment. As a consequence, it is possible for a user to vary the angle of the screen of the display main body 2 freely.

Then, in the flat panel display apparatus 1 according to this embodiment, a speaker enclosure 20 having two speakers 21 and 22 built therein are attached to the flat panel display apparatus 1 according to this embodiment in such a manner that the speaker enclosure 20 may be supported between upper portions of the right and left supports 14 and 15 extended in the vertical direction along the back of this stand 10. The speakers 21 and 22 built in this speaker enclosure 20 are speakers for outputting low-pitched sounds (hereinafter referred to as "woofers") and they are electrically connected to the display main body 2 placed on the stand 10 to output heavy low-pitched sounds.

In this flat panel display apparatus 1, the maximum outputs of the right and left speakers 4 and 5 of the display main body 2 are respectively 25 W and maximum outputs of the woofers 21 and 22 at the back side of the stand 10 are respectively 50 W. Thus, when the display main body 2 and the stand 10 are combined with each other, a sound system with a large volume of 100 W in total may be completed.

In particular, in the arrangement according to this embodiment, since the woofers 21 and 22 are assembled into the stand 10 which supports the display main body 2, the sound system with the large volume can be realized without requiring an extra space. Further, since the woofers 21 and 22 are located at the optimum positions of the back side of the display main body 2 in the state in which the display main body 2 is placed on the stand 10, the woofers 21 and 22 can be located at the optimum positions without cumbersome selection of the places in which they should be installed and hence the sound system with the large sound volume can be constructed with ease.

Further, in this flat panel display apparatus 1, since the supports 14 and 15 are extended in the vertical direction along the back side of the stand 10 on which the display main body 2 is placed and the speaker enclosure 20 with the woofers 21 and 22 built therein is supported between these supports 14 and 15, the speaker enclosure 20 can be formed large in size and it can be increased in volume so that a more powerful sound system with heavy low-pitched sounds can be realized.

Also, since this flat panel display apparatus 1 has the arrangement in which the speaker enclosure 20 having the woofers 21 and 22 built therein is located on the back side of the stand 10, the outside appearance of this flat panel display apparatus 1 can become entirely neat and simple as it is seen from the front.

Subsequently, the combined structure of the display main body 2 and the stand 10 in the flat panel display apparatus 1 according to this embodiment will be described more in detail.

Figure 3:
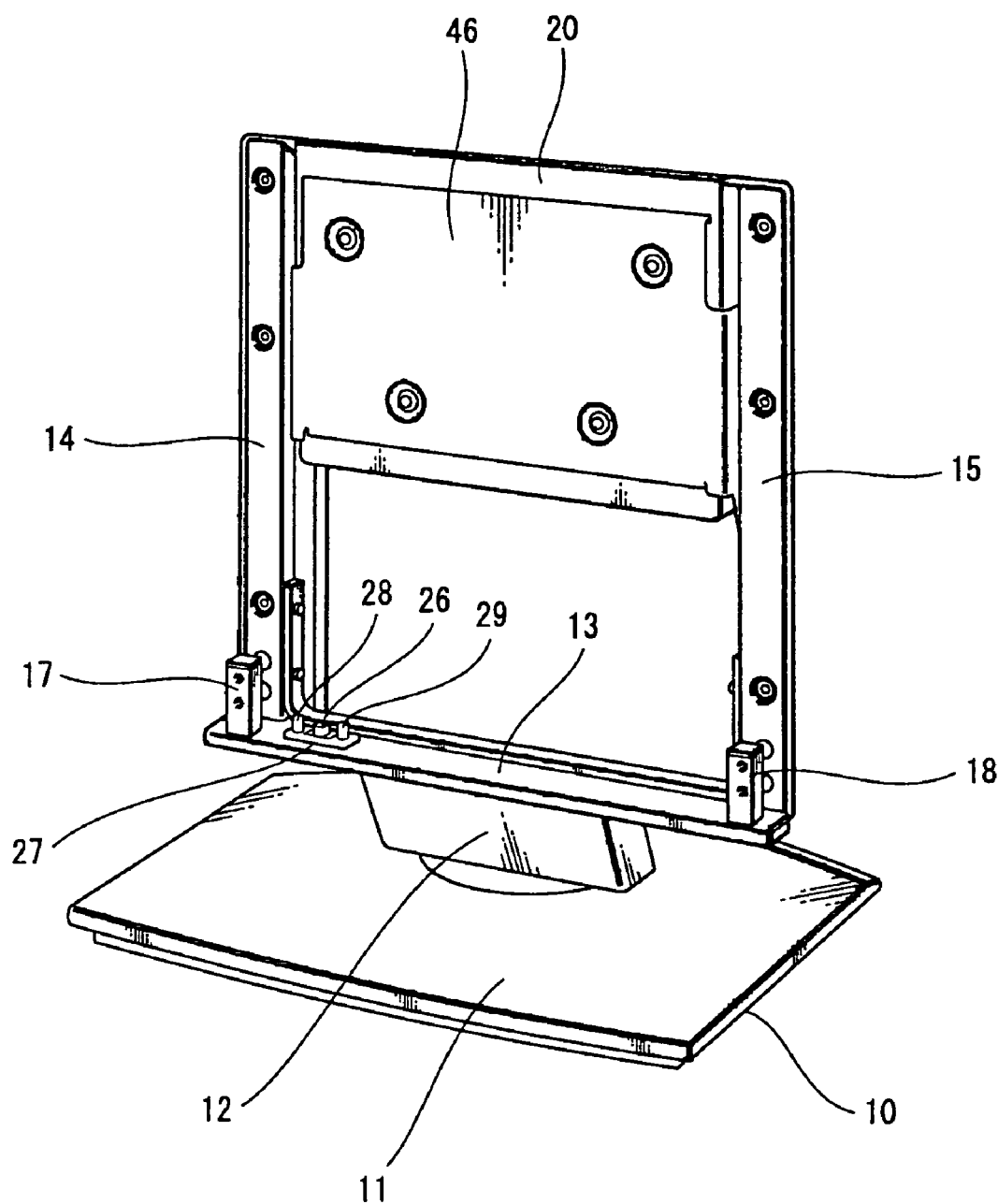
FIG. 3 is a perspective view of a stand.
Figure 4:
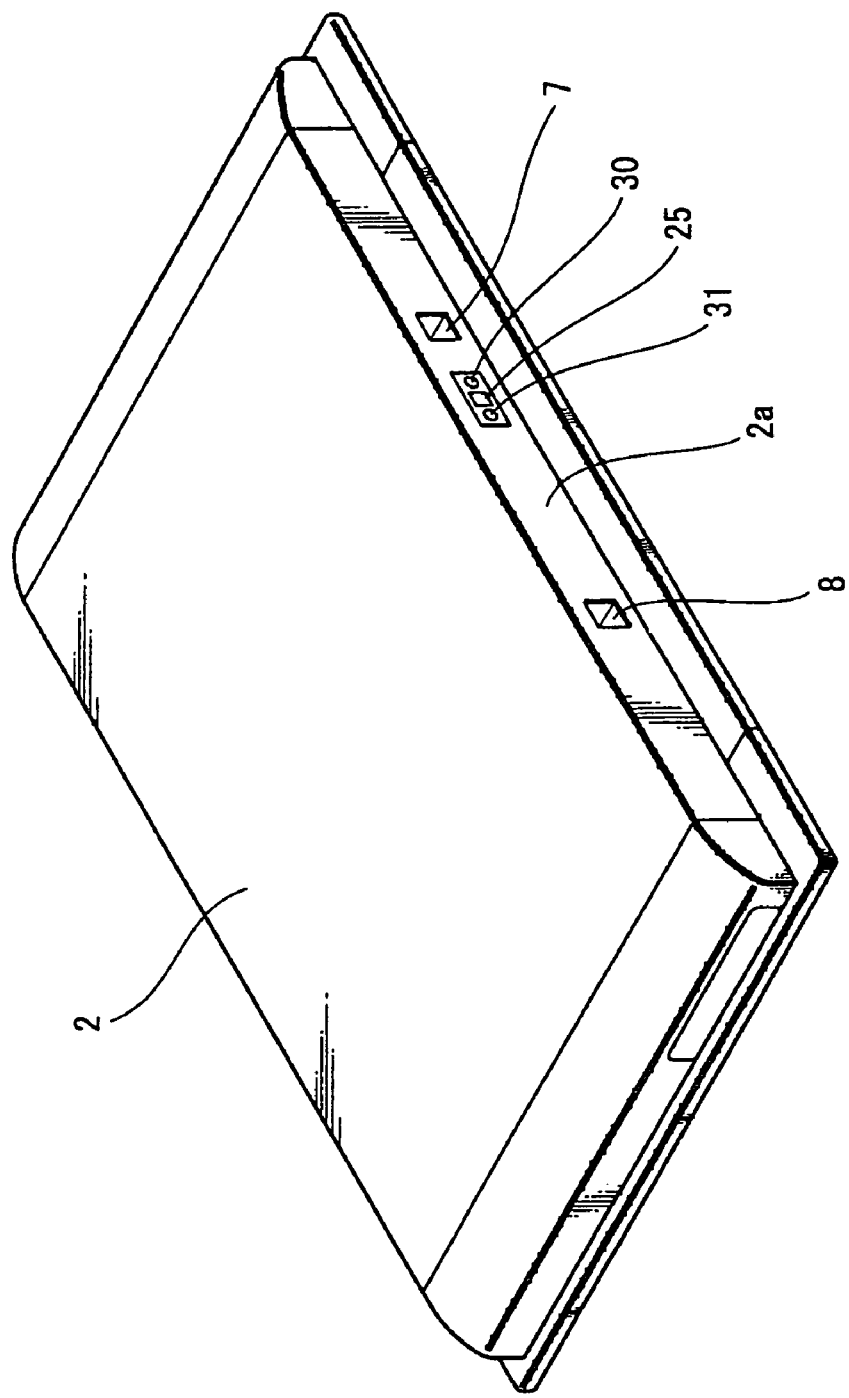
FIG. 4 is a perspective view showing a display main body from the bottom side in the state in which the display main body is laid face down.
Figure 5:
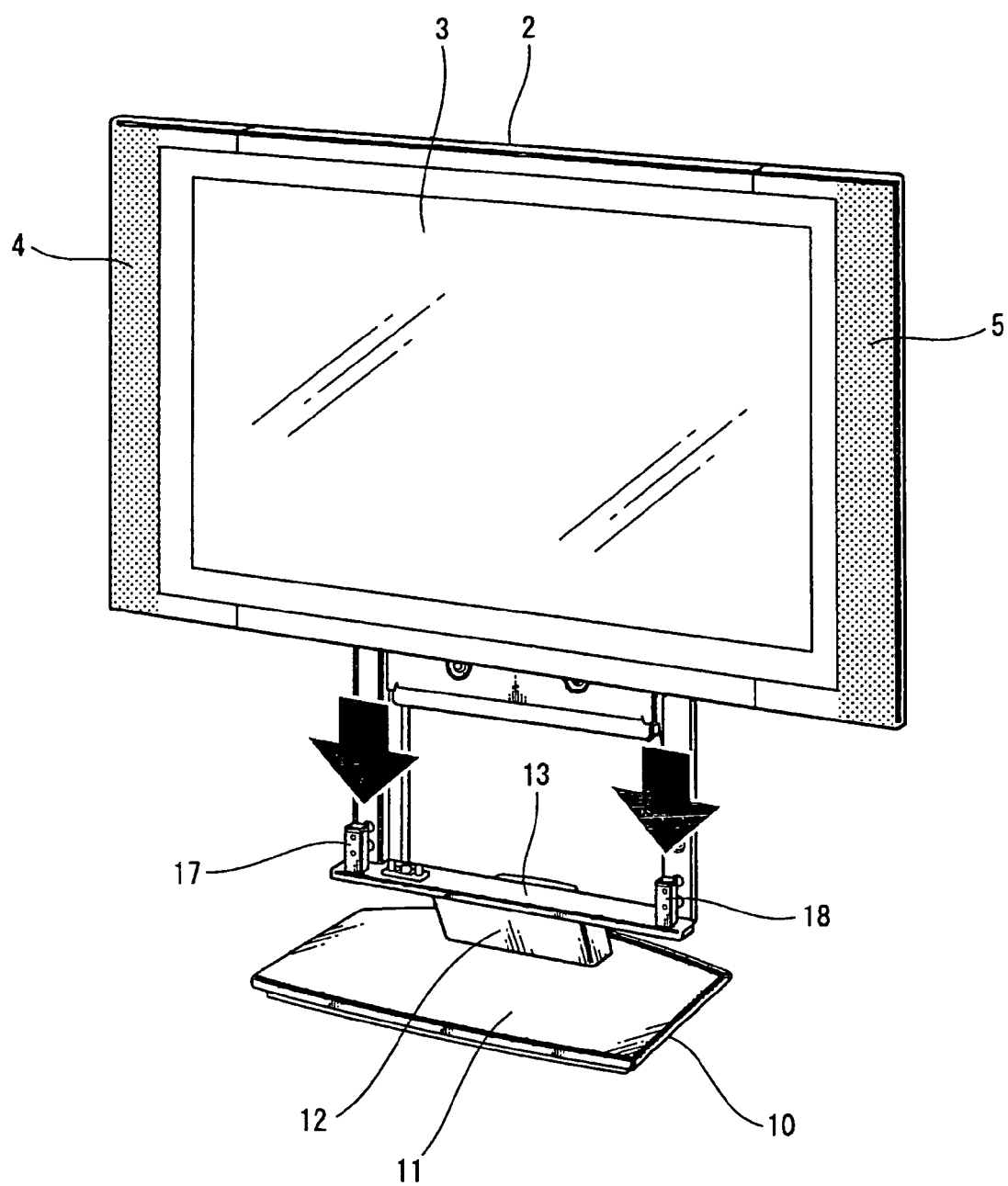
FIG. 5 is a perspective view to which reference will be made in explaining operations to place the display main body on the stand.

As shown in FIG. 3, in the stand 10, two protruding members 17 and 18 are provided at both left and right ends of the holder plate 13 in the vertical direction. Concurrently therewith, on the side of the display main body 2, two insertion holes 7, 8 are formed at the center of a bottom portion 2a as shown in FIG. 4. Then, when the display main body 2 and the stand 20 are combined together, the display main body 2 is placed on the holder plate 13 of the stand 10 from above as shown in FIG. 5 in such a manner that the insertion holes 7 and 8 may be fitted into the protruding members 17 and 18, whereby the protruding members 17 and 18 are inserted into and engaged with the insertion holes 7 and 8 to accurately position the display main body 2 and the stand 10. In that state, the display main body 2 and the stand 10 are integrated as one body by fixing the supports 14 and 15 to the display main body 2 with screws from the back side of the stand 10.

Figure 6:
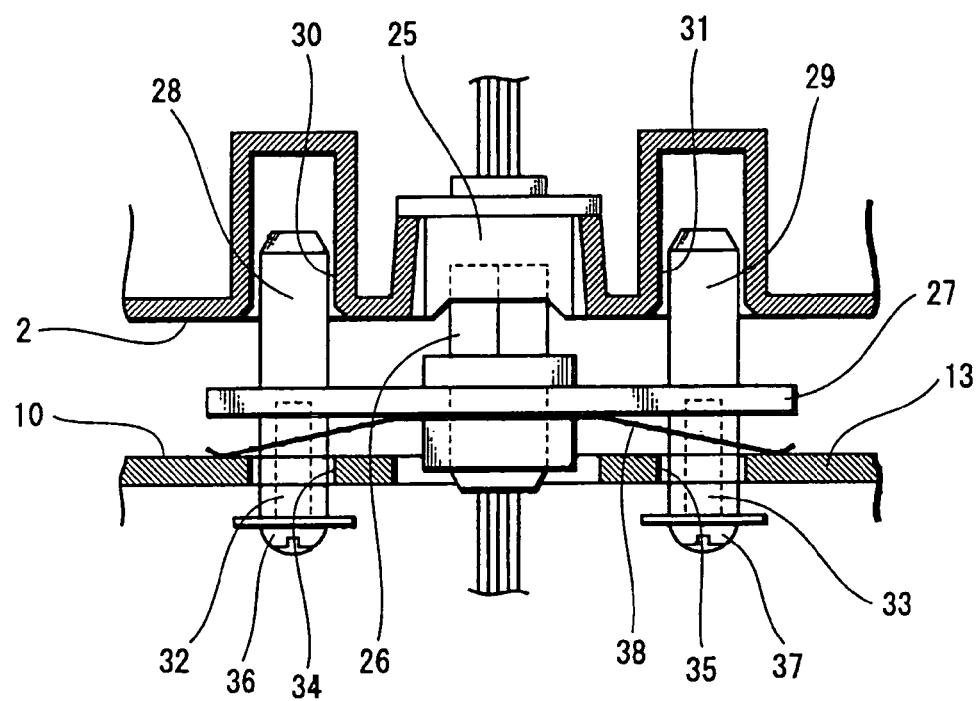
FIG. 6 is a longitudinal cross-sectional front view showing a structure of a connecting portion to electrically connect the display main body and a woofer.
Figure 7:
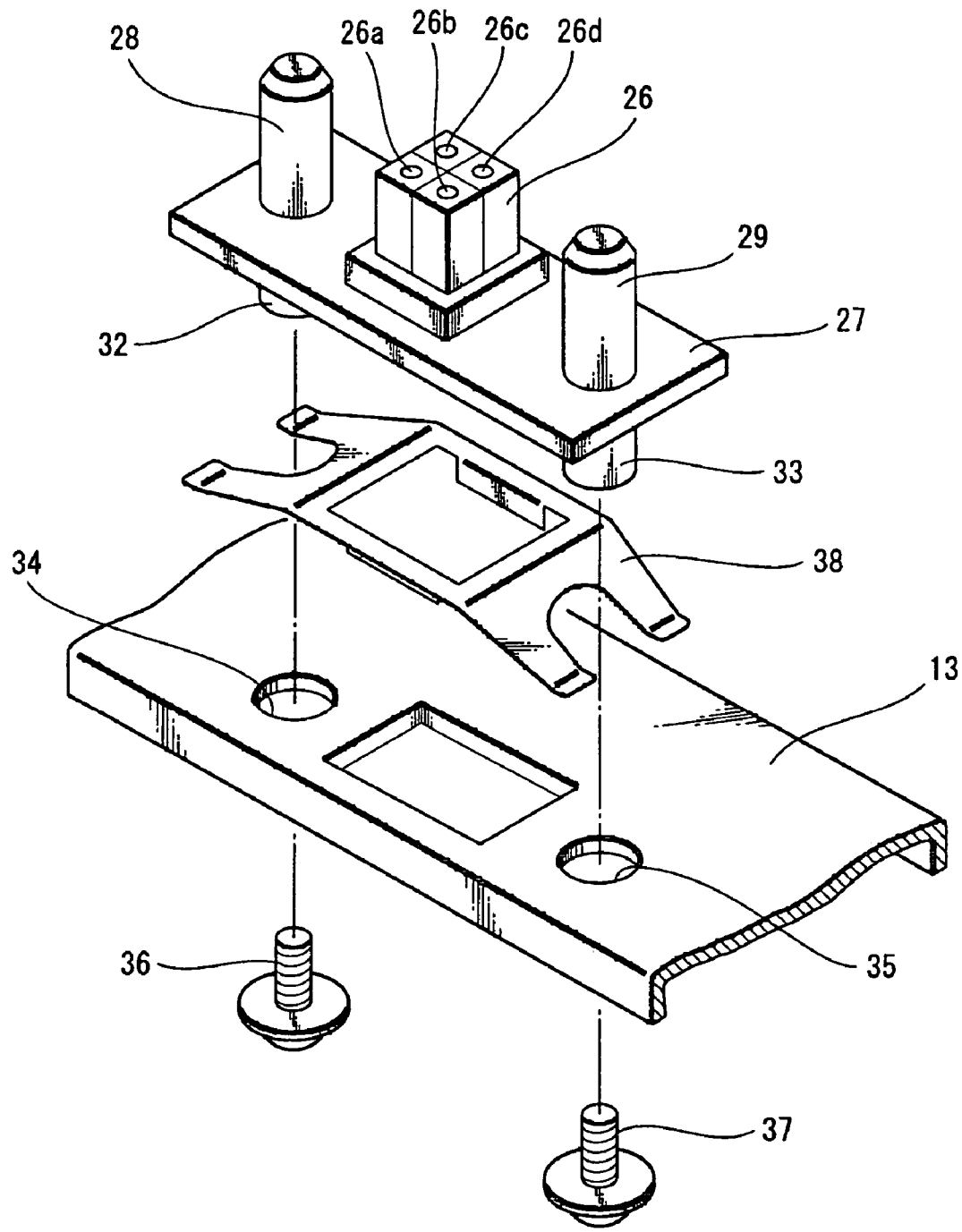
FIG. 7 is an exploded perspective view of a main portion of the connecting portion shown in FIG. 6.

This flat panel display apparatus 1 has the arrangement in which the display main body 2 can be electrically connected to the woofers 21 and 22 at the same time the display main body 2 is placed on the stand 10. FIGS. 6 and 7 show the structure of that connecting portion.

In FIGS. 6 and 7, reference numeral 25 denotes a connector on the side of the display main body 2 and reference numeral 26 denotes a connector on the side of the stand 10. When the connectors 25 and 26 are engaged with and joined with each other, the display main body 2 and the woofers 21 and 22 can be connected electrically.

The connector 26 on the side of the stand 10 is fixed to and held on a holding plate 27 provided on the holder plate 13. The holding plate 27 has small protruded members 28 and 29 extended in the vertical direction from left and right sides of the connector 26. Concurrently therewith, the display main body 2 has insertion holes 30 and 31 formed at left and right sides of the connector 25 on the bottom portion thereof.

The holding plate 27 has lower protruding members 32 and 33 formed on its lower surface side opposite to the small protruding members 28 and 29. The lower protruding members 32 and 33 are fitted into holes 34 and 35 bored on the holder plate 13 and fixed with washer screws 36 and 37 so that the holding plate 27 is assembled to the holder plate 13 so as to become movable in the upper and lower direction. A leaf spring 38 is inserted between this holding plate 27 and the holder plate 13 as a resilient member, and hence the connector 26 is constantly supported with resiliency under spring force of this leaf spring 38 so that it can be elevated in unison with the holding plate 27.

Then, when the display main body 2 is placed on the stand 10, the small protruding members 28 and 29 of the supporting plate 27 are inserted into the insertion holes 30 and 31 of the display main body 2 and the connectors 25 and 26 are fitted into and connected with each other, thereby resulting in the display main body 2 and the woofers 21 and 22 being connected electrically.

In this case, when the display main body 2 is placed on the stand 10, first, the protruding members 17 and 18 of the stand 10 are inserted into the insertion holes 7 and 8 as mentioned before. Thereafter, the small protruding members 28 and 29 are inserted into the insertion holes 30 and 31. When the protruding members 17 and 18 of the stand 10 are inserted into the insertion holes 7 and 8 of the display main body 2, a clearance produced between the display main body 2 and the stand 10 in the lateral direction is approximately 1 mm. Subsequently, when the small protruding members 28 and 29 are inserted into the insertion holes 30 and 31, a clearance becomes less than 0.5 mm. In this state, finally, the connectors 25 and 26 fitted into and connected with each other. Since the structure in which clearances are absorbed in a stepwise fashion as described above is employed, the connectors 25 and 26 can be fitted into and connected with each other reliably. The connector 25 is assembled on the side of the display main body 2 with small play in order to absorb an error occurred between it and the connector 26 on the side of the stand 10 when the connectors 25 and 26 are fitted into and connected with each other.

Further, in this connecting portion, the connector 26 on the side of the stand 10 is constantly urged against the connector 25 on the side of the display main body 2 under spring force of the leaf spring 38 and thereby the connector 26 can be prevented from being disengaged from the connector 25 and hence the connector 26 can be stably fitted into the connector 25. In this case, the connector 26 on the side of the stand 10 is fitted into the connector 25 on the side of the display main body 2 near the intermediate point of the range in which it can be moved in the upper and lower direction. That is, according to this arrangement, while a range in which the holding plate 27 for holding the connector 26 on the side of the stand 10 can be moved up and down relative to the holder plate 13 is approximately 1.4 mm, the connector 26 on the side of the stand 10 can be fitted into the connector 25 on the side of the display main body 2 at the intermediate point in which the holding plate 27 is elevated from the holder plate 13 about 0.7 mm. Therefore, the connector 26 on the side of the stand 10 can be urged against the connector 25 on the side of the display main body 2 with a margin and hence the connector 26 can be fitted into the connector 25 more stably.

As described above, since the flat panel display apparatus according to this embodiment has the structure in which the display main body 2 and the woofer 21 are electrically connected with each other at the same time the display main body 2 is placed on the stand 10, a user need not carry out a cumbersome connection work and the display main body 2 and the woofers 21, 22 can be electrically connected with each other reliably.

Particularly in this connecting portion, the connector 26 on the side of the stand 10 is constantly urged against the connector 25 on the side of the display main body 2 under spring force of the leaf spring 38 and thereby they are fitted into each other, the stable connected state can be maintained. Thus, when the flat panel display apparatus is packed and transported in the state in which the display main body 2 is combined with the stand 10, the connectors 26 and 26 can be prevented from being disengaged due to vibrations and the like produced upon transportation and hence reliability of the connection between the connectors 25 and 26 can be guaranteed.

In this embodiment, while the flat panel display apparatus has the structure in which the connector 26 on the side of the stand 10 is constantly urged against the connector 25 on the side of the display main body 2 under spring force of the leaf spring 38 as described above, the present invention is not limited thereto and the flat panel display apparatus may have an opposite structure in which the connector 25 on the side of the display main body 2 is constantly urged against the connector 26 on the side of the stand 10 under spring force of the leaf spring 38.

While the flat panel display apparatus according to this embodiment has the structure in which the display main body 2 and the woofers 21 and 22 are electrically connected with each other at the same time the display main body 2 is placed on the stand 10 as described above, when a connection mistake occurs in the connecting portion due to a cause such as an alien substance caught in the connecting portion, if a user continues to use this flat panel display apparatus without consciousness of the existence of such mistake, there is then a risk that original sound performance of this flat panel display apparatus will not be fully demonstrated upon use.

To solve this problem, according to this flat panel display apparatus, when a connection mistake occurs in the connecting portion, such connection mistake may be detected and an error message may be indicated on the screen.

Figure 8:
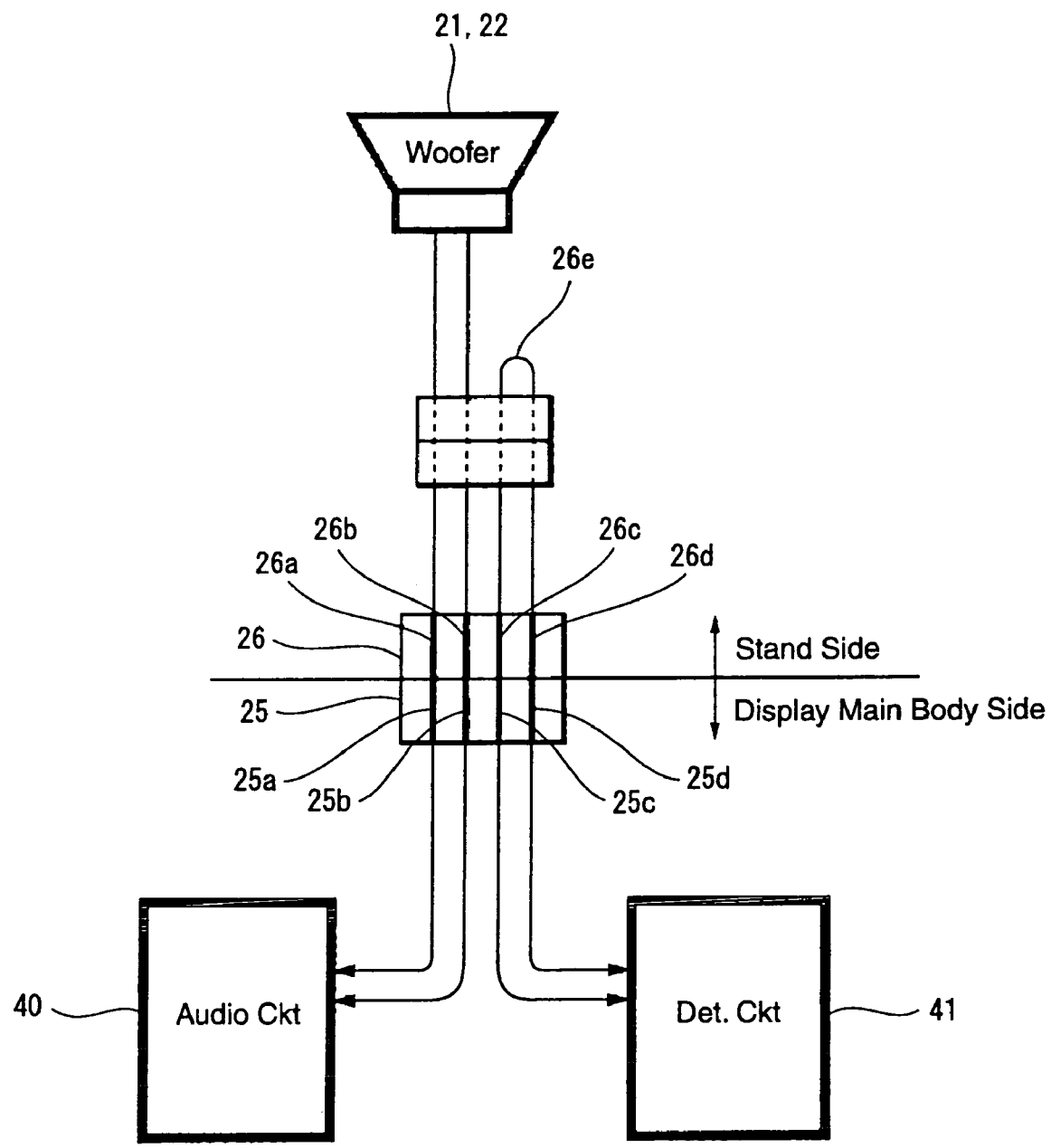
FIG. 8 is a schematic diagram showing a detecting means to detect a connection mistake of the connecting portion.

FIG. 8 is a schematic diagram showing an arrangement of a detecting means for detecting a connection mistake in the connecting portion of the flat panel display apparatus according to the present invention. As shown in FIG. 8, in this connecting portion, the connectors 25 and 26 includes four connection terminals $25a$, $25b$, $25c$, $25c$ and $26a$, $26b$, $26c$, $26d$. The two connection terminals $25a$, $25b$ and $26a$, $26b$ are provided for use with audio signals, that is, these audio connection terminals $25a$, $25b$ and $26a$, $26b$ are used to connect an audio circuit 40 on the side of the display main body 2 side to the woofers 21 and 22 on the side of the stand 10 with each other, whereby audio signals are supplied from the audio circuit 40 to the woofers 21 and 22 and heavy low-pitched sounds are outputted from the woofers 21 and 22.

The remaining two connection terminals $25c$, $25d$ and $26c$, $26d$ are used to detect connections, that is, the connection terminals $25c$ and $25d$ are connected to a detecting circuit 41 on the side of the display main body 2, while the connection terminals $26c$ and $26d$ are short-circuited at a U-turn connection portion $26e$ within the stand 10. The detecting circuit 41 causes a detection electric current to flow through the connection terminals $25c$, $25d$ and $26c$, $26d$ and it can detect the connection state based on energized states of the connection terminals $25c$, $25d$ and $26c$, $26d$. Specifically, when the connectors 25 and 26 are connected with each other correctly, the detection electric current flows through the connection terminals $25c$, $25d$ and $26c$, $26d$. When the connectors 25 and 26 are not connected with each other correctly, no detection electric current flows through the connection terminals $25c$, $25d$ and $26c$, $26d$. In this case, it is determined that a connection mistake occurred in the connecting portion.

Figure 9:
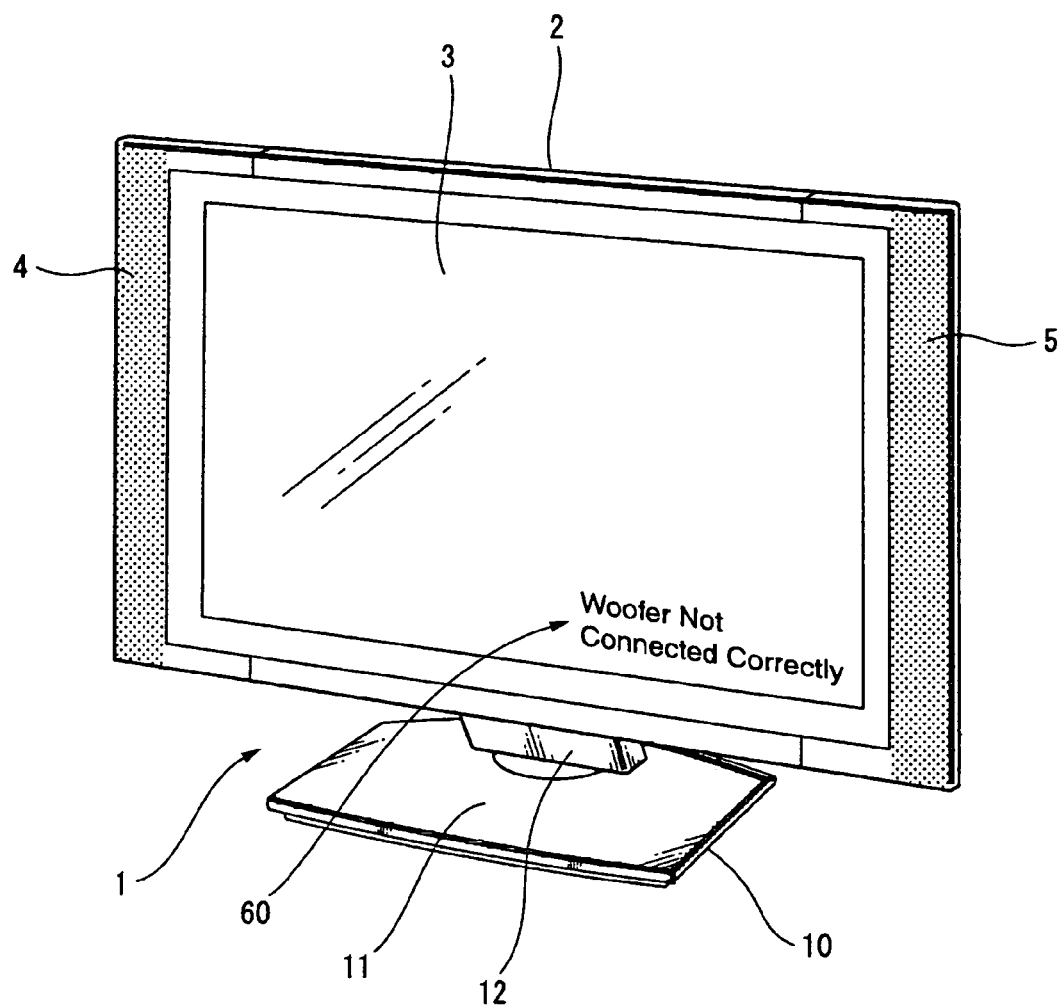
FIG. 9 is a perspective view showing an example of a message indicated on the screen of the flat panel display apparatus.

Then, when the detecting circuit 41 detects a connection mistake, under control of a command from a control apparatus (microcomputer), character information previously stored in a memory from a character signal generating apparatus (character generator) is outputted and this character information is indicated at the end of the screen 2 of the display main body 2 as a message 60 indicative of a connection mistake as shown in FIG. 9.

A series of operations concerning this message indication will be described below with reference to a flowchart of FIG. 10.

Figure 10:
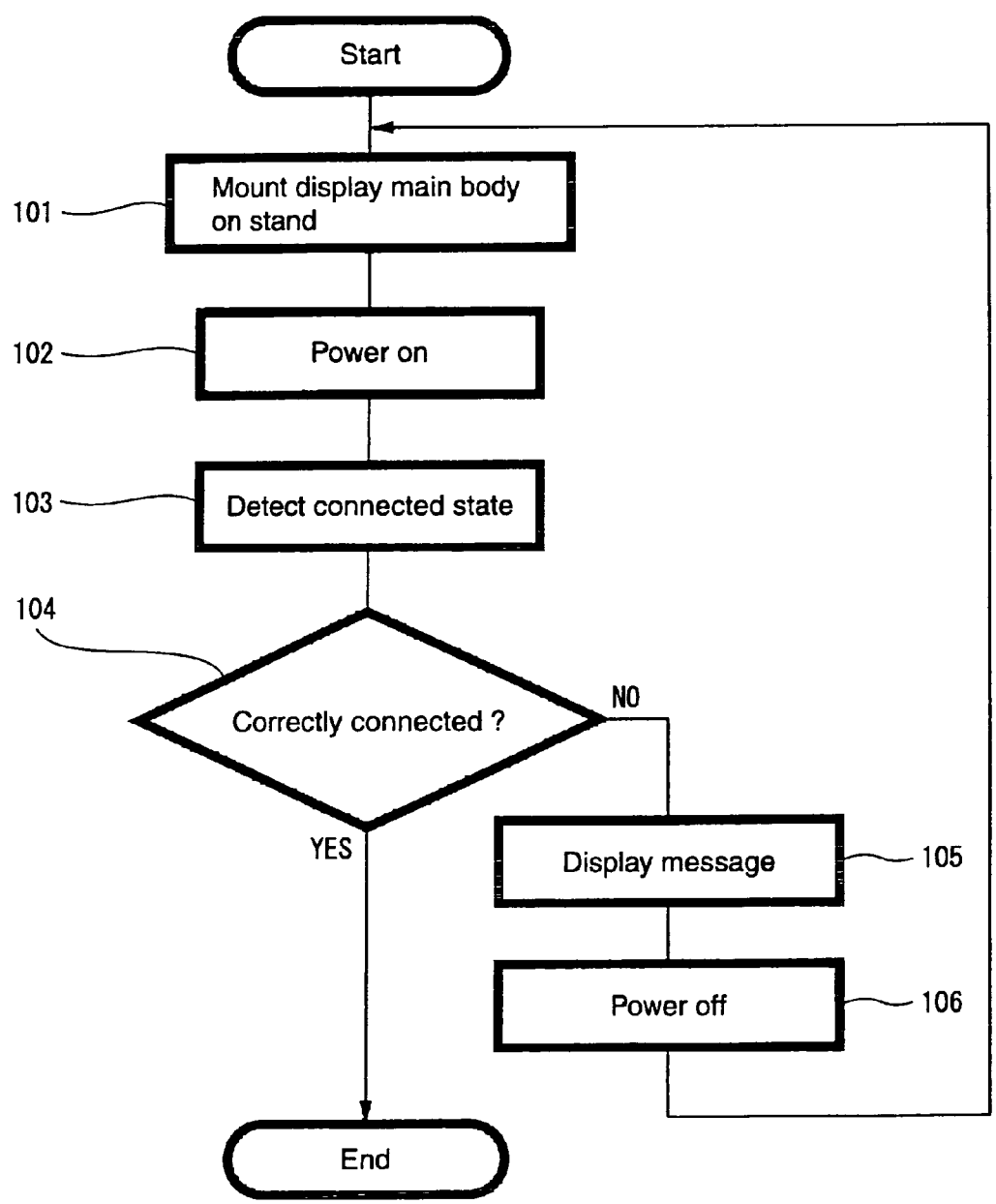
FIG. 10 is a flowchart to which reference will be made in explaining the manner to indicate a message.

Referring to FIG. 10, and following the start of operation, first, a user places the display main body 2 on the stand 10 at a step 101. Then, when the user energizes the display main body 2 at a step 102, the detecting circuit 41 is operated to detect the connection state at a step 103. Then, control goes to the next decision step 104, whereat it is determined by the control apparatus whether or not the connecting portion is connected correctly. If the connecting portion is connected correctly as represented by a YES at the decision step 104, then the detection operation is ended. If on the other hand the connecting portion is not connected correctly as represented by a NO at the decision step 104, then control goes to a step 105, whereat the character signal generating apparatus is energized to indicate a message on the screen 3 of the display main body 2. Then, control goes to a step 106, whereat the user who had visually confirmed this message on the screen 3 is turned off the power switch of the display main body 2. Then, control goes back to the step 101, whereat the user places the display main body 2 on the stand 10 one more time.

As described above, according to the flat panel display apparatus of this embodiment, since the connection mistake occurred when the display main body 2 and the woofers 21 and 22 are not correctly connected with each other is detected and the message indicative of such connection mistake is displayed on the screen 3, it is possible to avoid the user from continuing to use the flat panel display apparatus without consciousness of the connection mistake and therefore the original sound effect of this flat panel display apparatus can be fully demonstrated when the flat panel display apparatus is in use.

Next, a slide mechanism for adjusting the position of the speaker enclosure 20 in response to the size of the display main body 2 placed on the stand 10 in the flat panel display apparatus according to this embodiment will be described.

A plurality of types of display main bodies of the same design with different sizes may be available as the display main body 2. Those different types of the display main bodies are roughly classified into small types (37-inch to 42-inch screen) and large types (50-inch screen). Referring back to FIG. 3, in any of the small types and large types of the display main bodies 2, a terminal portion 44 with various external connection terminals 44a arrayed thereon is provided at the back side thereof. The position and size of this terminal portion 44 are different depending on the type of the display main body. More specifically, in the case of the large type display main body, the terminal portion 44 is located in the upper direction and it is formed large in size as compared with the small type display main body. Accordingly, in order for a user to connect the external connection cords with the terminals 44a of the terminal portion 44 without being disturbed by the speaker enclosure 20, particularly, in the stand 10 according to this embodiment, the speaker enclosure 20 can be slid in the upper and lower direction upon adjustment.

Figure 11:
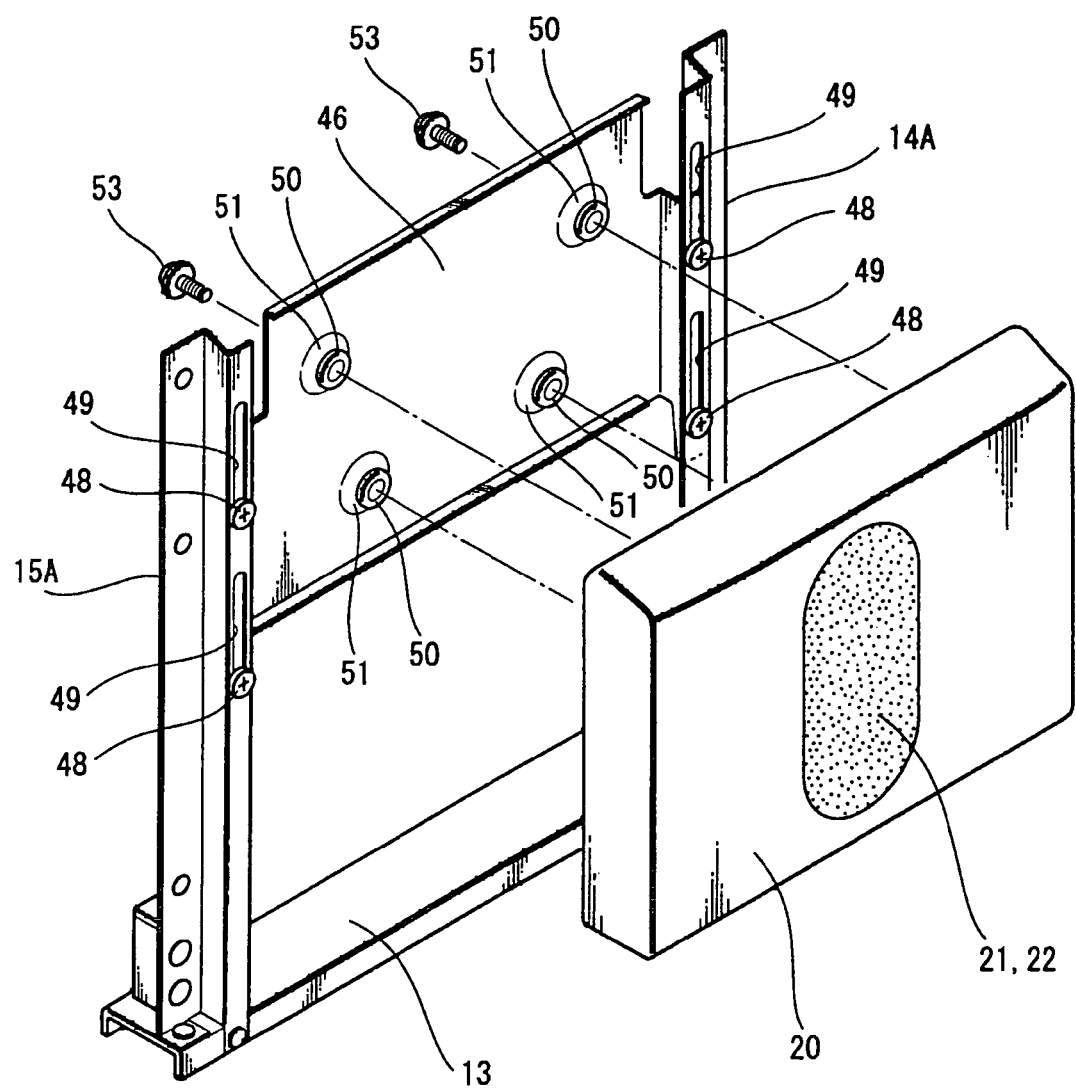
FIG. 11 is an exploded perspective view showing an arrangement of a slide mechanism of a speaker enclosure.

As shown in FIG. 11, in the stand 10 according to this embodiment, a back plate 46 is supported between guide rails 14A and 15A constructing the core materials of the supports extended on the holder plate 13 in the vertical direction such that it can be slid in the upper and lower direction. The speaker enclosure 20 is fixed to this back plate 46 by screws 53. The back plate 46 is brought in surface contact with the guide rails 14A and 15A at the end face portions of the respective sides and fastened to the end face portions by screws 48. Oblong holes 49 are formed in the guide rails 14A and 15A in the upper and lower direction and the back plate 46 is supported to the guide rails 14A and 15A by inserting the screws 48 into the oblong holes 49 so that the back plate 46 can be slid in the upper and lower direction.

According to the above-mentioned arrangement, the speaker enclosure 20 can be slid in the upper and lower direction in the range in which the screws 48 are moved along the oblong holes 49, the speaker enclosure 20 can be fixed to the arbitrary slide position by fastening the screws 48, and the speaker enclosure 20 can be made again slidable by loosening the screws 48.

Figure 12:
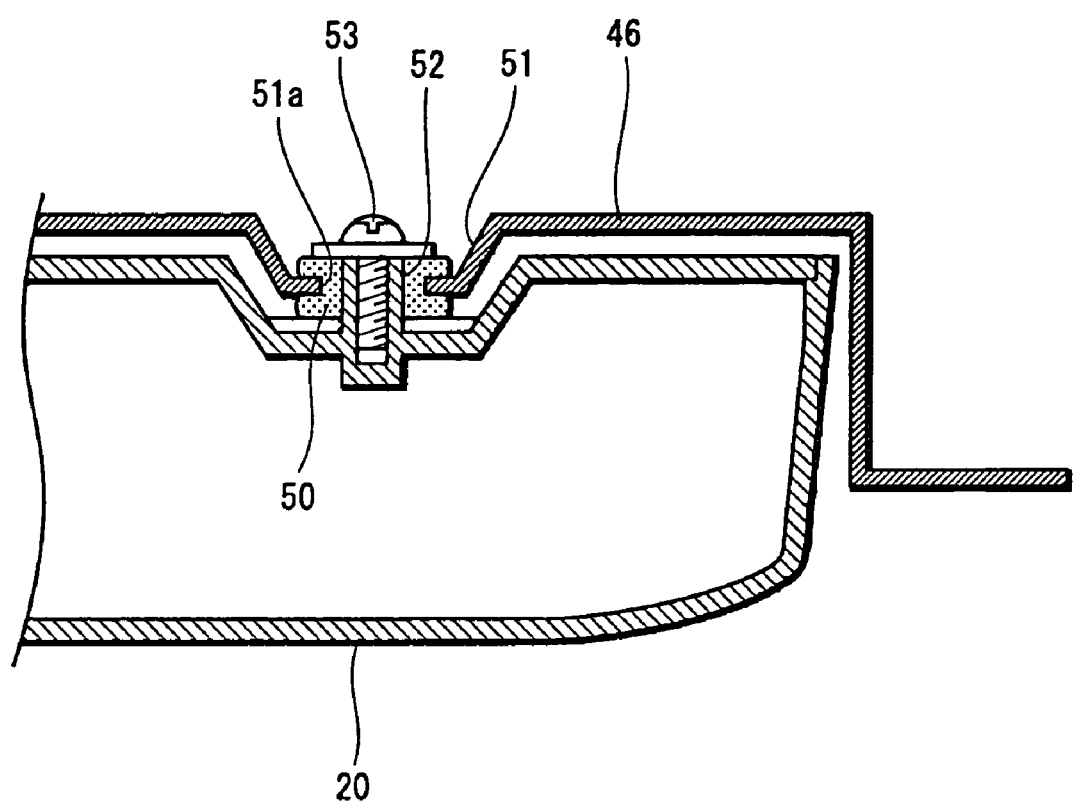
FIG. 12 is a transversal cross-sectional view showing a support structure of the speaker enclosure.
Figure 13:
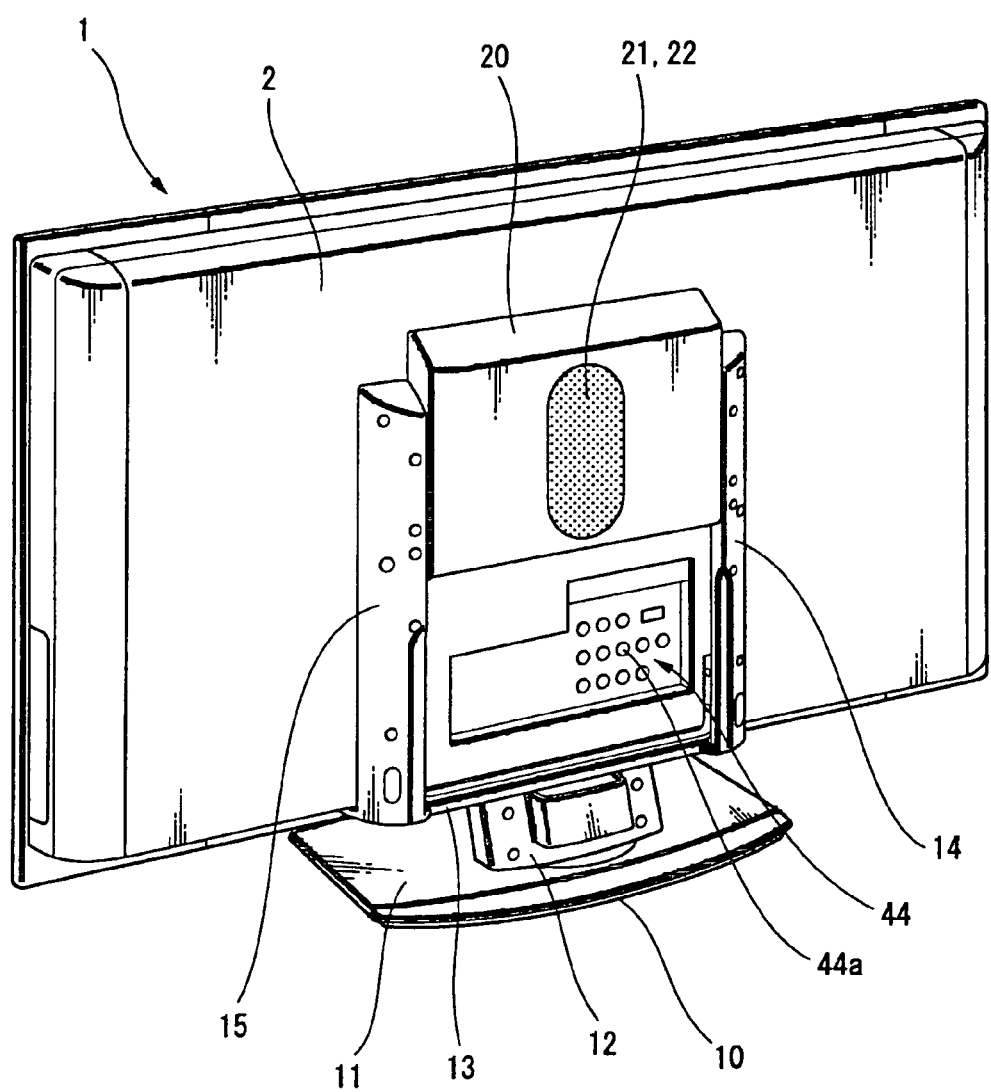
FIG. 13 is a perspective view showing the state in which the speaker enclosure is slid in the upper direction.

Since the speaker enclosure 20 can be adjusted so as to become slidable in the upper and lower direction as described above, the stand 10 according to this embodiment can be applied to a plurality of kinds of the display main bodies 2 with different sizes. More specifically, when the display main body 2 is of the small type, the speaker enclosure 20 is located at the ordinary position as shown in FIG. 2. When the speaker enclosure 20 is of the large type, the speaker enclosure 20 is slid in the upper direction as shown in FIG. 12, whereby the user can connect the external connection cord to the terminal 44a on the terminal portion 44 without being disturbed by the speaker enclosure 20. Also, having considered the sound effect of this flat panel display apparatus, it is possible for the user to adjust the height position of the speaker enclosure 20 to the optimum height position.

Further, as shown in FIGS. 11 and 12, the speaker enclosure 20 is supported to the stand 10 through cushion materials 50. In this embodiment, the stand 10 has a plurality of recessed portions 51 formed on the back plate 46, and the annular cushion materials 50 made of a suitable material such as elastomer are fitted into holes 51a formed at the centers of the recessed portions 51. Then, stems 52 projecting from the speaker enclosure 20 are inserted into the center holes of the cushion materials 50 and secured by washer screws 53 as shown in FIG. 12.

According to the structure in which the cushion materials 50 are interposed between the speaker enclosure 20 and the back plate 46 as described above, vibrations of heavy low-pitched sound transmitted from the speaker enclosure 20 can be effectively absorbed by the cushion materials 50. In particular, when sound of large volume is outputted from the speaker enclosure 20 at a large output, vibrations can be prevented from being transmitted to the display main body 2 and distortion and resonance of sound in the display main body 2 can be prevented so that clear sounds can be emanated from the speaker enclosure 20.

Subsequently, the arrangement of the speaker enclosure 20 will be described more in detail with reference to FIG. 14 to 23.

Figure 14:
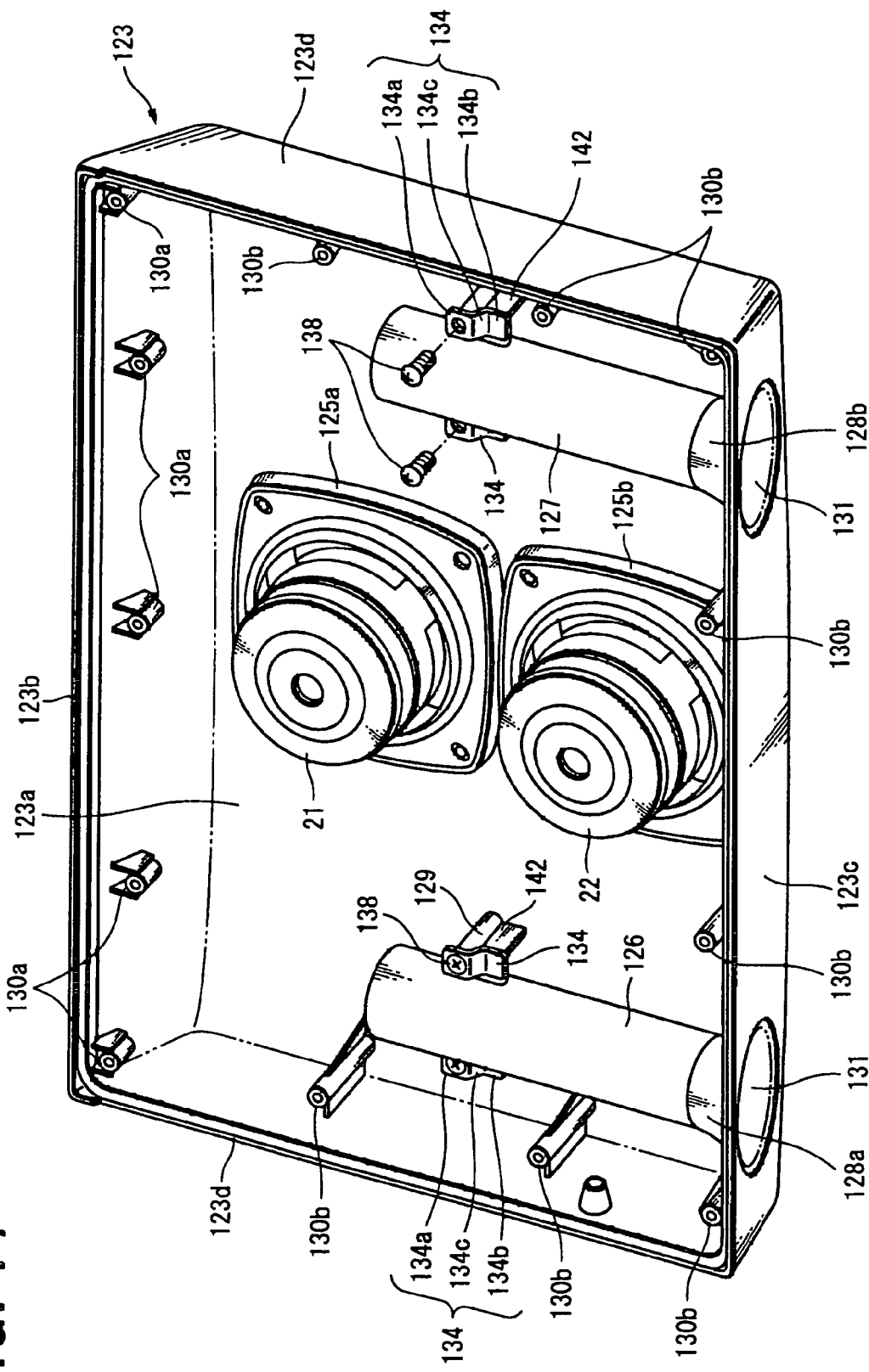
FIG. 14 is a perspective view showing the inside of the enclosure main body of the speaker enclosure.
Figure 15:
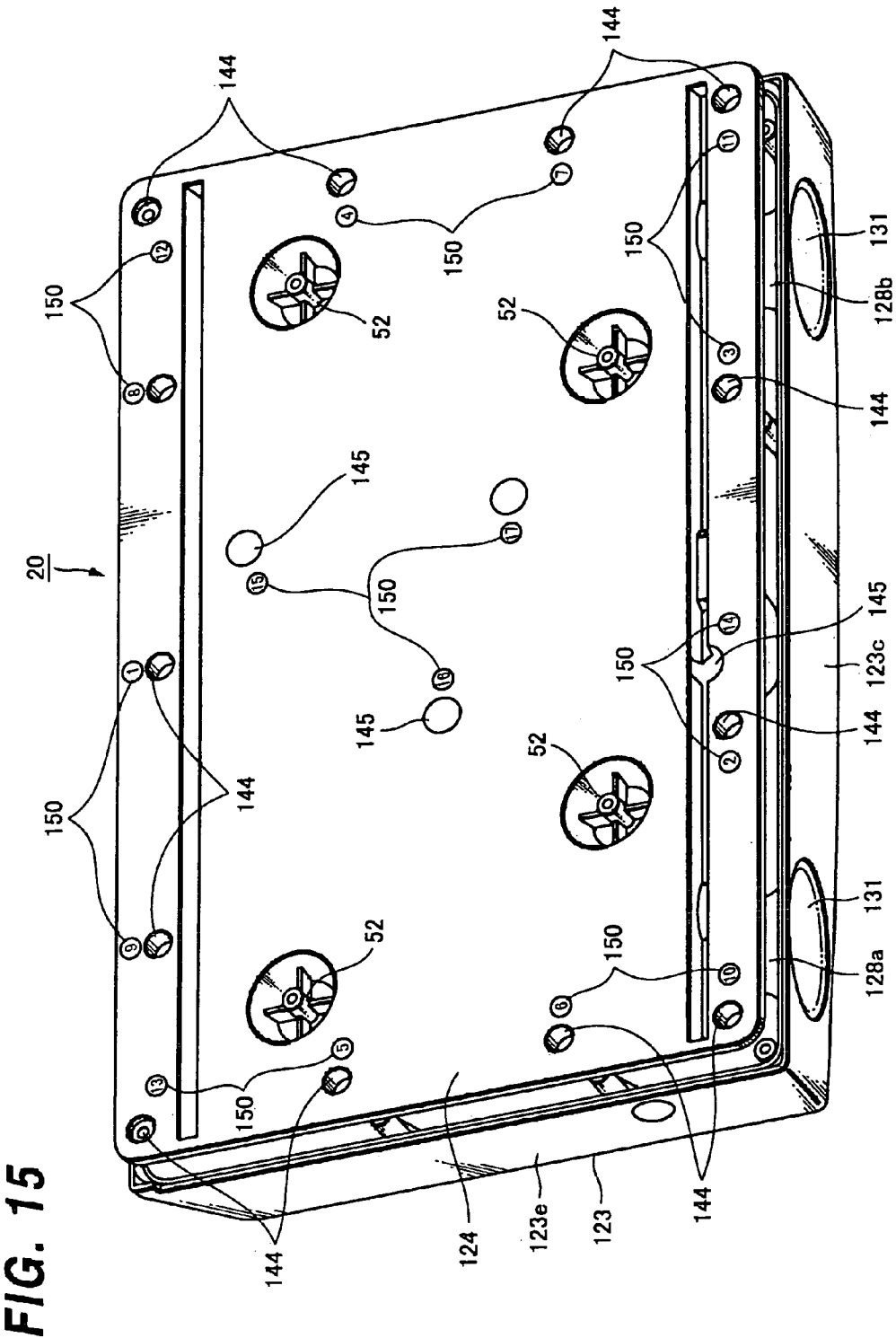
FIG. 15 is a perspective view showing the state presented before a lid is fitted into the enclosure main body of the speaker enclosure.
Figure 16:
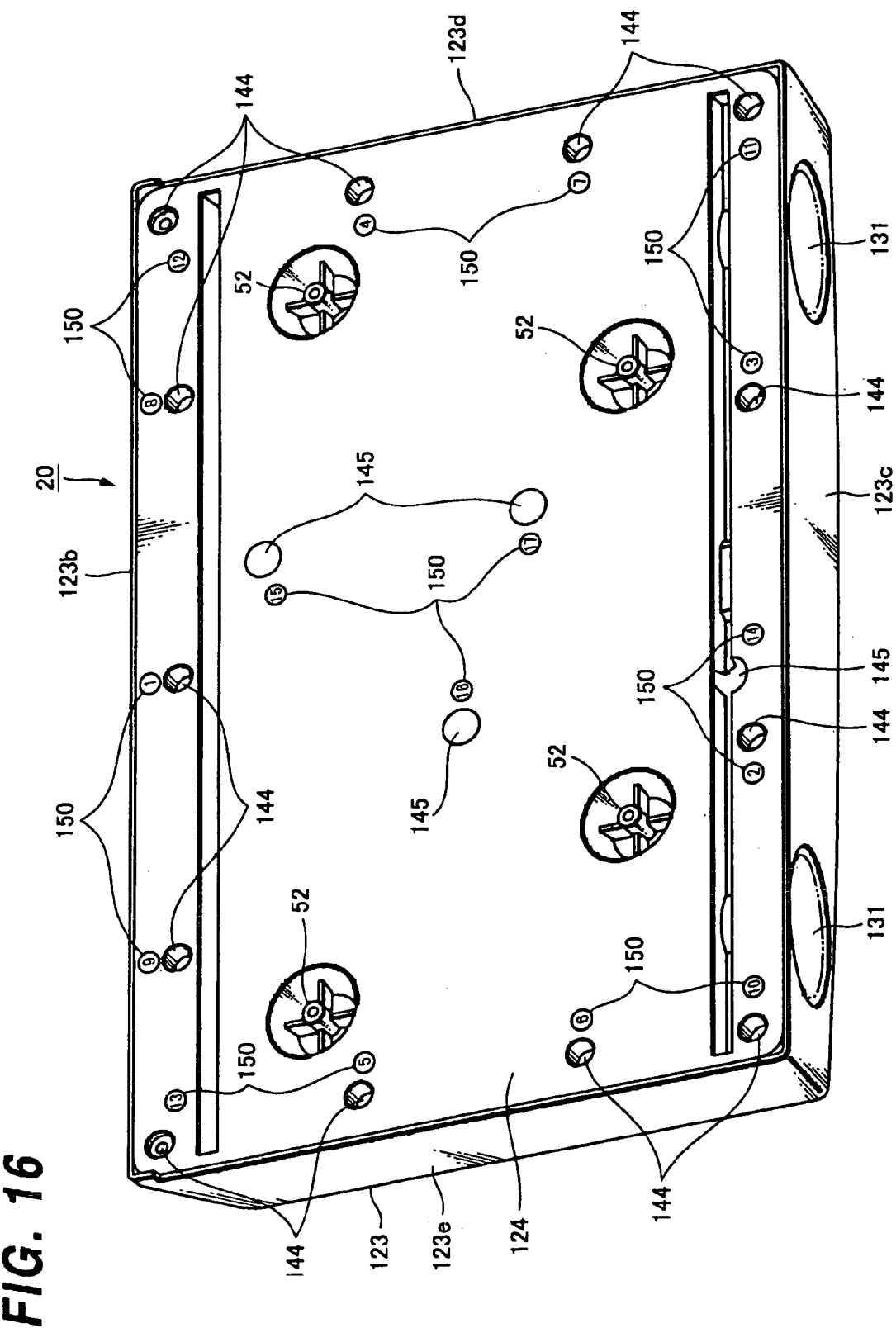
FIG. 16 is a perspective view showing the state presented after a lid was fitted into the enclosure main body of the speaker enclosure.
Figure 18:
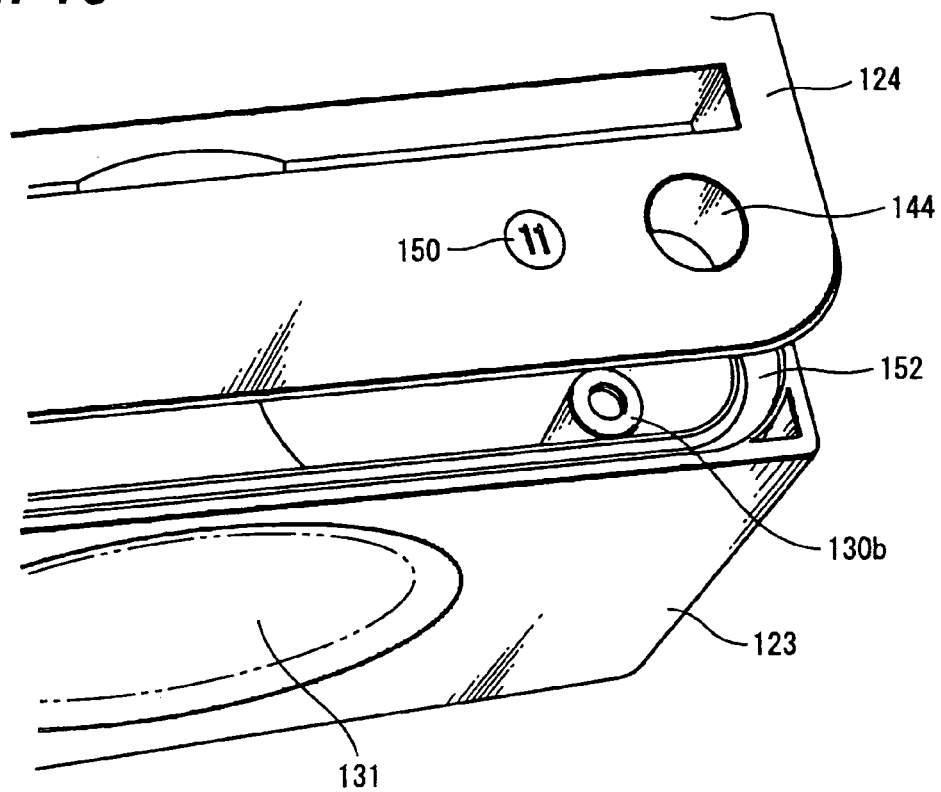
FIG. 18 is an explanatory diagram showing a main portion of FIG. 15.
Figure 19A:
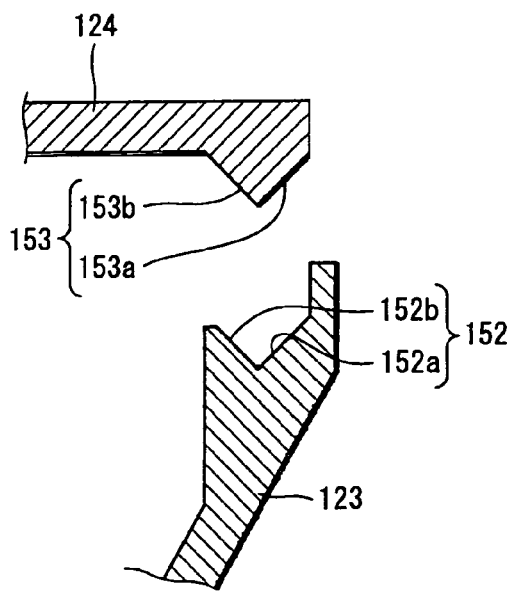
FIG. 19A is a cross-sectional view showing a main portion of FIG. 17A in an enlarged-scale.
Figure 19B:
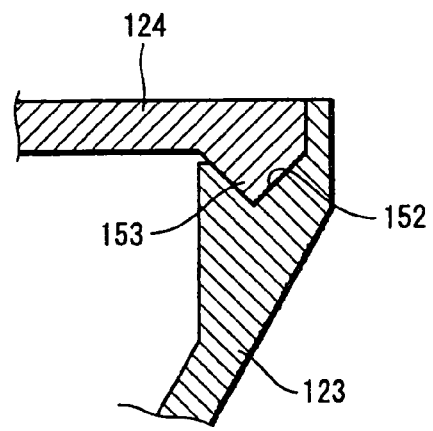
FIG. 19B is a cross-sectional view showing a main portion of FIG. 17B in an enlarged-scale.
Figure 20A:
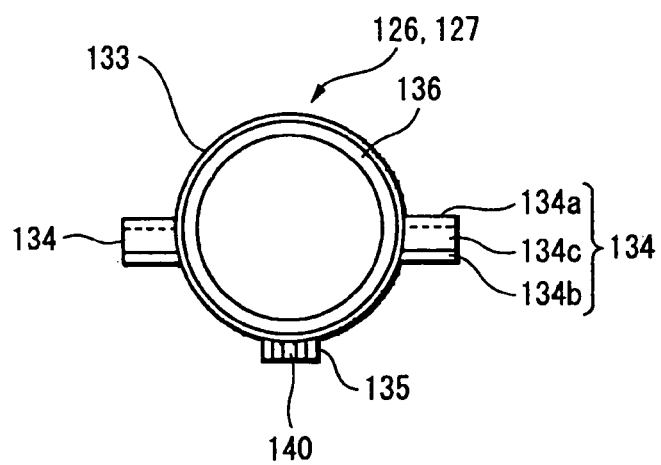
Figure 20B:
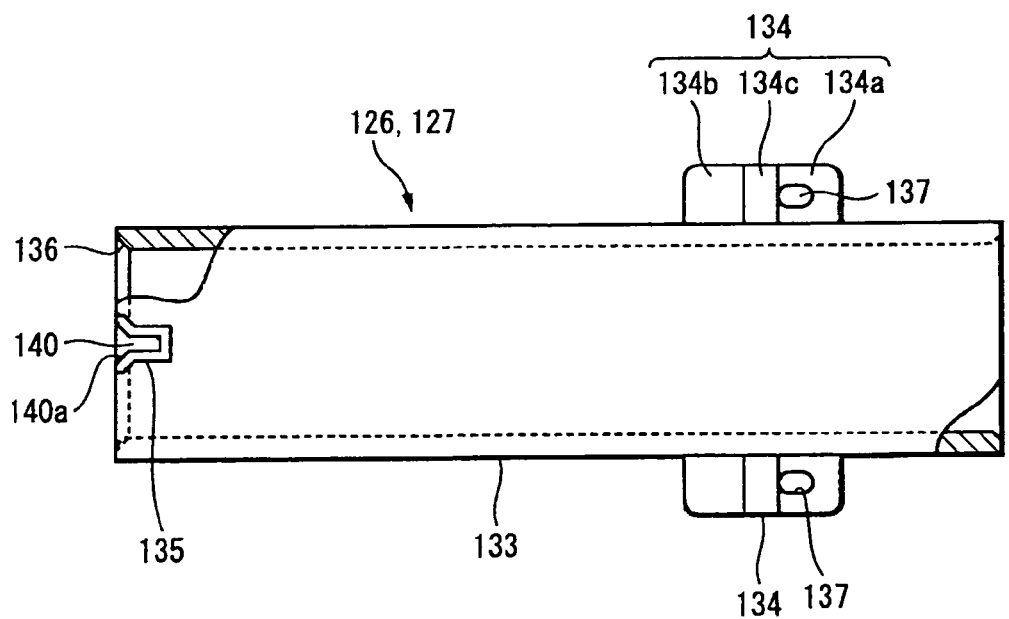
Figure 22:
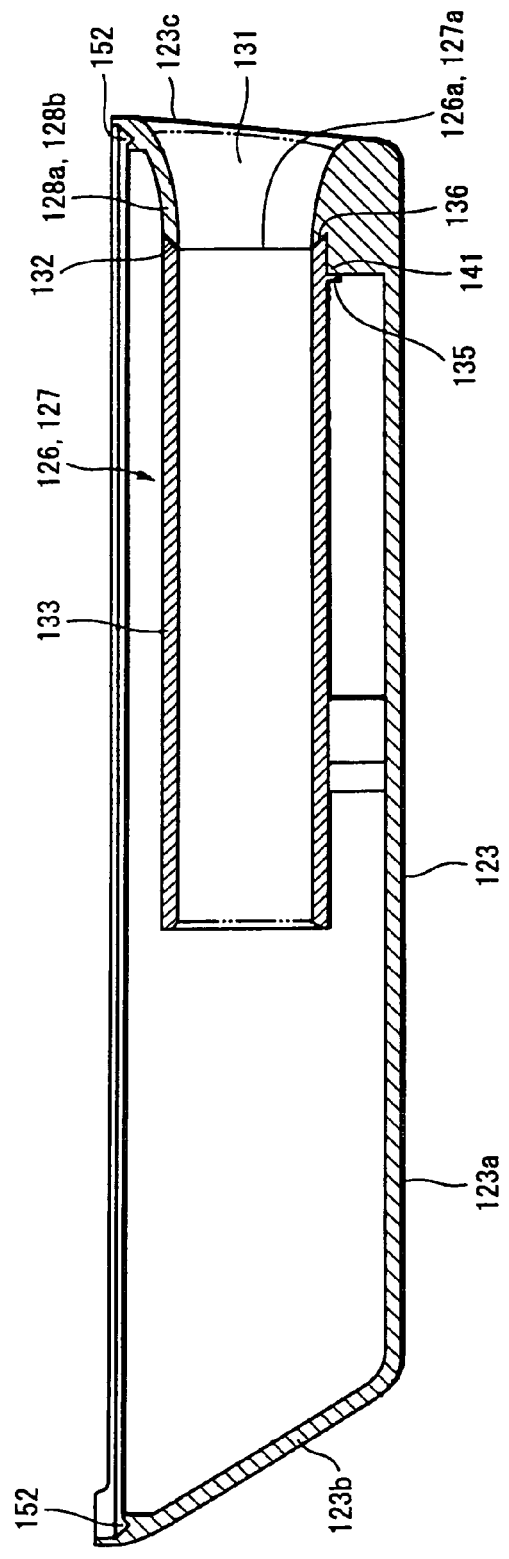
FIG. 22 is a cross-sectional view showing a bass reflex duct portion of the speaker enclosure.
Figure 23A:
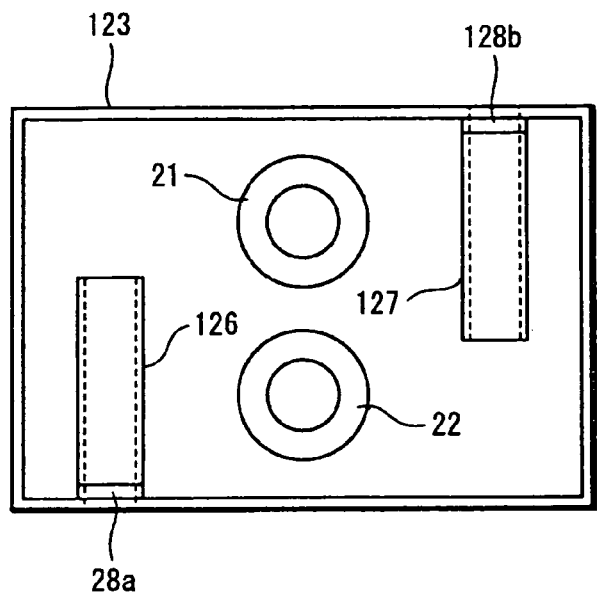
Figure 23B:
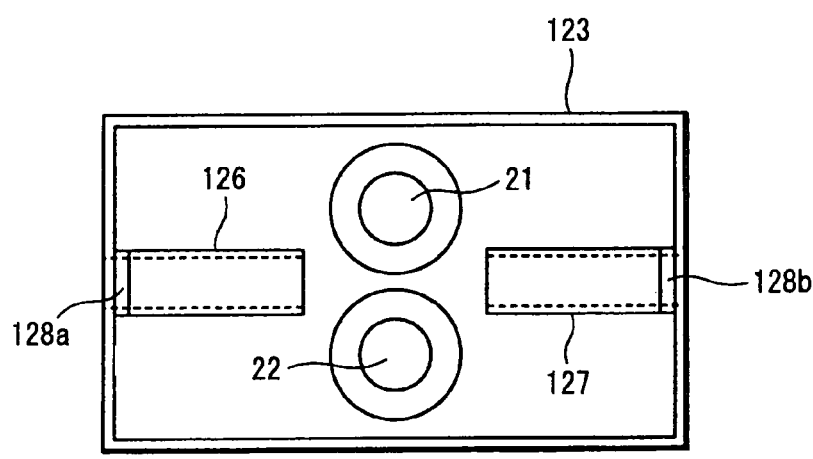
Figure 23C:
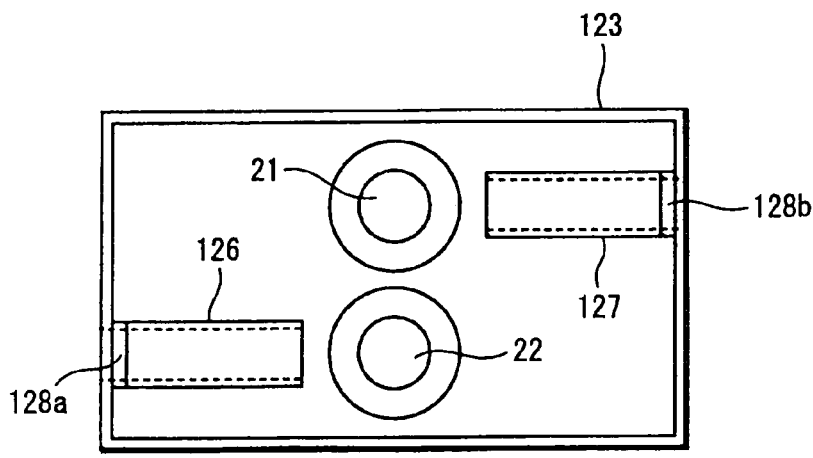

FIG. 14 is a perspective view showing the inside of the enclosure main body of the speaker enclosure; FIG. 15 is a perspective view showing the state obtained before a lid is fitted into the enclosure main body; FIG. 16 is a perspective view showing the state obtained after the lid was fitted into the enclosure main body; FIGS. 17A and 17B are cross-sectional views showing the states obtained before and after the lid is fitted into the enclosure main body, respectively; FIG. 18 is an explanatory diagram showing a main portion of FIG. 15 in an enlarged-scale; FIGS. 19A and 19B are explanatory diagrams showing the main portions of FIGS. 17A and 17B in an enlarged-scale; FIGS. 20A and 20B are a front view of a bass reflex duct and a partly-cross-sectional bottom view of the bass reflex duct, respectively; FIGS. 21A and 21B are explanatory diagrams showing the states obtained before and after the bass reflex duct is joined to a bass reflex duct connecting portion; FIG. 22 is a cross-sectional view showing a bass reflex duct connecting portion; and FIG. 23A, 23B and 23C are explanatory diagrams showing another example of the layout of the bass reflex duct, respectively.

In this embodiment, a speaker apparatus whose speaker enclosure can be reduced in thickness and which is suitable for use with electronic equipment such as a flat panel display apparatus of which thickness should be very requested to be reduced can be realized by a simple arrangement.

As shown in FIGS. 14 to 17A, 17B and the like, the speaker enclosure 20 is constructed as a casing composed of an enclosure main body 123 of which the back portion is open, with a lid 124 detachably mounted to the back portion of this enclosure main body 123. The enclosure main body 123 includes an oblong rectangular front portion 123a, an upper surface portion 123b continued to the upper end edge of this front portion 123a, a lower surface portion 123c continued to the lower end edge of the front portion 123a and a left side portion 123d and a right side portion 123e.

As shown in FIG. 14, the enclosure main body 123 houses therein two speaker attachment portions 125a and 125b to attach woofers 21 and 22 which are two speaker units, two enclosure side connecting portions 128a and 128b to which two bass reflex ducts 126 and 127 are joined, duct supporting portions 129 and 129 to support the two bass reflex ducts 126 and 127 and two kinds of bosses 130a and 130b to attach the lid 124.

As shown in FIG. 14, the two speaker attachment portions 125a and 125b are located at the central portion of the inner surface of the front portion 123a in such a manner that they may be aligned in the upper and lower direction. A large number of through-holes are bored on the front surfaces of the two speaker attachment portions 125a and 125b in order to radiate sound waves to the outside, although not shown. The two woofers 21 and 22 are detachably fixed to the respective speaker attachment portions 125a and 125b by fixed screws, not shown.

The two enclosure side connecting portions 128a and 128b are located on the lower surface portion 123c of the enclosure main boy 123 with a predetermined spacing therebetween in such a manner that they may be axially symmetrical relative to the two woofers 21 and 22 in the right and left directions. The two enclosure side connecting portions 128a and 128b are formed of annular protruded portions which are slightly recessed in the inside. Holes opened at the centers of the two enclosure side connecting portions 128a and 128b construct opening portions 131 and 131 which are connected with holes of the two bass reflex ducts 126 and 127. As shown in FIGS. 21A and 22, the enclosure side connecting portions 128a and 128b have conic tapered portions 132 provided at their tip end portions. Duct side connecting portions 126a and 127a of the bass reflex ducts 126 and 127 are fitted into the two enclosure side connecting portions 128a and 128b.

The two bass reflex ducts 126 and 127 are identical to each other and they have the arrangement shown in FIG. 20A, 20B and the like. That is, each of the bass reflex ducts 126 and 127 includes a pipe-like duct main body 133, a pair of fixed members 134 and 134 provided on the outer peripheral surface of the duct main body 133 and a stopper portion 135 provided at one end of the outer peripheral surface of the duct main body 133 in the axial direction. Then, the duct main body 133 has a tapered receiving portion 136 with the same inclination angle, fitted into the two tapered portions 132 of the enclosure side connecting portions 128a and 128b, provided at the end portion of the stopper portion 135 side.

The pair of fixed members 134 and 134 are formed to be symmetrical in the right and left direction in such a manner that they may be projected toward the outside of the diametrical direction in the intermediate portion of the axial direction of the duct main body 133. Each fixed member 134 includes an upper surface portion 134a and a lower surface portion 134b developed in the axial direction and which are spaced apart by a predetermined spacing in the upper and lower direction and an inclined surface portion 134c to join the upper surface portion 134a and the lower surface portion 134b with a proper inclination angle. A screw aperture 137 is bored on the upper surface portion 134a and this screw aperture 137 is extended in the axial direction of the duct main body 133. The bass reflex ducts 126 and 127 are fastened to and fixed to the enclosure main body 123 by the fixed screw 139 inserted into this screw aperture 137.

The stopper portion 135 is provided for the purpose of properly positioning the bass reflex ducts 126 and 127 to the enclosure main body 123. The stopper portion 135 is formed of a rail-like portion having a U-like flat surface shape to form an engagement groove 140, and the engagement portion 140 has a tapered and widened introducing portion 140a provided at the entrance thereof as shown in FIG. 20B. A positioning member 141 provided on the lower portions of the enclosure side connecting portions 128a and 128b of the enclosure main body 123 is engaged with this engagement groove 140 as shown in FIG. 21A, 21B and FIG. 22. When this positioning member 141 is engaged with the engagement groove 140, the bass reflex ducts 126 and 127 can be prevented from being moved to the side of the enclosure side connecting portions 128a and 128b in the axial direction and the bass reflex ducts 126 and 127 can be prevented from being rotated.

A pair of duct supporting portions 129 and 129 for supporting the bass reflex ducts 126 and 127 in the state in which the bass reflex ducts 126 and 127 are joined to the enclosure side connecting portions 128a and 128b are respectively formed on the inner surface of the front portion 123a of the enclosure main body 123 in an opposing relation to the pair of fixed members 134 and 134. Each duct supporting portion 129 includes a reinforcing member 142 projected to the side of the enclosure side connecting portions 128a and 128b, and an inclined surface receiving portion 142a inclined in the same direction as the inclined surface portion 134c of the fixed member 134 is provided at the upper end of the reinforcing member 142.

As shown in FIG. 14, of the two kinds of the bosses 130a and 130b, the first boss 130a is provided at the intermediate portion of the inner surface of the upper surface portion 123b which is formed on the enclosure main body 123 with a small inclination angle in the upper direction. In this embodiment, five first bosses 130b are provided in the lateral direction with a proper spacing therebetween. Also, the second boss 130b is erected on the inner surface of the front portion 123a of the enclosure main body 123 along right and left side portions 123d and 123e. In this embodiment, eight second bosses 130b are provided. Each of the bosses 130a and 130b has a screw hole opened on its supper surface.

The lid 124 that can open and close the rear portion of the enclosure main body 123 having the above-mentioned arrangement has an arrangement shown in FIG. 15 to FIGS. 17A and 17B. The lid 124 is formed of a plate material which can cover the whole of the rear portion of the enclosure main body 123. This lid 124 has screw holes 144 formed at its positions corresponding to the two kinds of bosses 130a and 130b of the enclosure main body 123 as shown in FIG. 15. Because all of these screw holes 144 are provided along the peripheral edge of the lid 124, a plurality of screw holes 145

(four screw holes 145 in this embodiment) is provided in order to fasten the central portion of the lid 124 to the side of the enclosure main body 123 by screws. Bosses corresponding to the screw holes 145 are not shown in FIG. 14.

In this embodiment, the lid 124 is fastened to the enclosure main body 123 by 17 fixed screws. Then, identification marks 150 (numbers in this embodiment) which serve as standards for screwing work required when the lid 124 is assembled to the enclosure main body 123 are indicated near the respective screw holes 144 and 145. The identification marks 150 are indicated in the sequential order of screwing. First, the identification marks 150 are located in such a manner that they are started from the central portion of the outer peripheral edge to the corner portions, being located at the central portion so that screwing work may be completed in the end.

By tightening the fixed screws in accordance with the sequential order of the numbers of the identification marks 150, the lid 124 can be thoroughly fastened to the enclosure main body 123 in a well-balanced fashion and the whole of the outer peripheral edge of the lid 124 can be evenly made close to the whole of the outer peripheral edge of the enclosure main body 123, thereby resulting in airtightness being improved. It is preferable that this identification mark 150 should be impressed on the tip end of a projection pin which is used to extract the lid 124 from a metal mold for injection molding, the identification mark 150 being formed by using the mark of the projection pin. In this case, since special facilities and parts to impress the identification mark 150 need not be provided and the existing metal mold can be used, it is possible to prevent metal mold expense from being increased.

The joined portion in which the enclosure main body 123 and the lid 124 are engaged with each other has an airtight structure of which cross-section is illustrated in FIG. 18 and FIGS. 19A and 19B in an enlarged-scale. Specifically, as illustrated, the enclosure main body 123 has a tapered groove 152 of V-like cross-section continuously formed around the whole periphery of its outer edge portion. Concurrently therewith, the lid 124 has a tapered protruded rail 153 of V-like cross-section formed around the whole periphery of its outer edge portion.

On the peripheral edge portion of the enclosure main body 123, there is formed the tapered groove 152 which consists of an outside inclined surface 152a outwardly inclined and an inside inclined surface 152b formed of an inclined surface folded at substantially a right angle relative to the outside inclined surface 152a. Then, in response to these outside inclined surface 152a and inside inclined surface 152b, an outside inclined surface 153a and an inside inclined surface 153b formed of an inclined surface folded at substantially a right angle relative to this outside inclined surface 153a to constitute a tapered protruded rail 153. Airtightness of the lid 124 relative to the enclosure main body 123 can be extremely increased by fitting the tapered protruded rail 153 into the tapered groove 152.

The speaker enclosure 20 having the above-mentioned arrangement can easily be assembled as follows, for example. As shown in FIG. 14, first, the woofers 21 and 22 that are the predetermined speaker units are attached to the two speaker attachment portions 125a and 125b of the enclosure main body 123 by screws.

Next, the two bass reflex ducts 126 and 127 are respectively assembled to the two enclosure side connecting portions 128a and 128b of the enclosure main body 123. This assembly work can be carried out as follows. First, as shown in FIG. 21A, a duct side connecting portion 126a (or 127a) provided at one end of the duct main body 133 is faced to an enclosure side connecting portion 128a (or 128b). At that time, respective lower surface portions 134b of a pair of fixed members 134, 134 provided on the respective bass reflex ducts 126 and 127 are brought in contact with the upper surfaces of a pair of duct supporting portions 129 and 129 of the enclosure main body 123.

Next, inclined surface portions 134c of the respective fixed members 134 are moved along an inclined surface receiving portion 142a of a reinforcing member 142 unitarily formed with the respective duct supporting portions 129, whereby the duct side connecting portion 126a (or 127a) of the bass reflex duct 126 (or 127) is fitted into the enclosure side connecting portion 128a (or 128b) as shown in FIG. 21B. At that time, positioning members 141 of the enclosure main body 123 are respectively engaged with engagement grooves 140 of stopper portions 135 of the respective bass reflex ducts 126 and 127.

Subsequently, as shown in FIG. 14, by fastening the fixed member 134 with the fixed screw 138, due to reaction force from the inclined surface receiving portion 142a, the bass reflex duct 126 (or 127) is given pressing force to press the bass reflex duct 126 (or 127) to the side of the enclosure side connecting portion 128a (or 128b). As a result, the bass reflex duct 126 (or 127) is connected to the enclosure side connecting portion 128a (or 128b) such that the duct side connecting portion 126a (or 127a) is urged against the enclosure side connecting portion 128a (or 128b) and thereby strongly fitted thereto.

Thereafter, as shown in FIG. 15 to FIGS. 17A and 17B, the lid 124 is fitted into the opening portion of the back side of the enclosure main body 123. Thus, as shown in FIG. 18 and FIGS. 19A and 19B, the tapered protruding rail 153 provided on the outer peripheral edge of the inner surface of the lid 124 is engaged with the tapered groove 153 provided on the outer peripheral edge of the opening portion of the enclosure main body 123. In this state in which the tapered protruding rail 153 is engaged with the tapered groove 153, the fixed screws are applied in the sequential order of the numbers indicated in the identification marks 150 and the lid 124 is fastened to and fixed to the enclosure main body 123 with a plurality of fixed screws.

At that time, since the tapered groove 152 formed of the V-like concave portion is provided on one of the whole periphery of the joined portion of the enclosure main body 123 and the lid 124 and the tapered protruding rail 153 formed of the V-like convex portion corresponding to the tapered groove 152 is provided on the other of the whole periphery of the joined portion, whereafter the tapered groove 152 and the tapered protruding rail 153 are fixed together with screws, the occurrences of the recess of the side between the portions fixed with the screws and distortion can be corrected so that the tapered groove 152 and the tapered protruding rail 153 can be made close to each other. In addition, when the tapered groove 152 and the tapered protruding rail 153 are fixed together with the fixed screws, the fixed screws are located at an interval as equal as possible so that fastening force may be applied equally. Also, since the identification marks 150 are provided such that the lid 124 is started to be fastened with screws from the center of the side of lid 124 to the corner portions thereof, an ideal airtight environment can be realized even by mass-production.

Further, according to this embodiment, a sealant is not required and hence a cost of assemblies can be decreased. In addition, since the sealant is not used, this is desirable from an environmental problem standpoint and assembly properties and disassembly properties of the speaker enclosure can be improved. Further, since the fixed screws used to fix the lid 124 to the enclosure main body 123 are all housed within the holes 144 and 145 bored on the lid 124 and the head portions of the fixed screws are not exposed on the surface of the lid 124, the screw heads can be prevented from being exposed from an appearance standpoint and a stable fastened state between the lid 124 and the enclosure main body 123 can be obtained.

The speaker apparatus having the above-mentioned arrangement is able to radiate sound waves of the bass register as follows. More specifically, a part of sounds from the two woofers 21 and 22 can be from a number of through-holes bored through the central portion of the front surface portion 123a of the enclosure main body 123 of the speaker enclosure 20 to the back side of the flat panel display apparatus 1. At the same time, sound waves radiated from the backs of the two woofers 21 and 22 into the speaker enclosure 20 are radiated to the outside of the enclosure through the two bass reflex ducts 126 and 127 from the two opening portions 131 and 132 formed on the lower surface portion 123c of the speaker enclosure 20. Sound radiated from the opening portion 131 is radiated with a phase matched with that of sound wave from the front surface, whereby the bass register can be reinforced and a powerful low-pitched sound can be generated from the speaker apparatus of the present invention.

FIG. 23A, 23B and 23C show other embodiments of the layout structures of the bass reflex ducts 126 and 127. FIG. 23A shows other embodiment of the layout structure in which the two bass reflex ducts 126 and 127 are located relative to the woofers 21 and 22 in a point symmetry fashion. More specifically, the second enclosure side connecting portion 128a in the above-described embodiment is provided on the upper surface portion 123b of the enclosure main body 123 and the second bass reflex duct 127 is connected to the enclosure side connecting portion 128b, thereby the second bass reflex duct 127 being suspended from the enclosure side connecting portion 128b. According to this arrangement, there can be achieved similar effects to those of the above-described embodiments.

FIGS. 23B and 23C show arrangements in which the two bass reflex ducts 126 and 127 are located in the lateral direction to radiate sound waves from the left and right directions. More specifically, FIG. 23B shows the arrangement in which the two bass reflex ducts 126 and 127 are located relative to the two woofers 21 and 22 in an axial symmetry fashion. As shown in FIG. 23B, the two bass reflex ducts 126 and 127 are located across the two woofers 21 and 22 in an opposing relation. Also, FIG. 23C shows the arrangement in which the two bass reflex ducts 126 and 127 are located relative to the two woofers 21 and 22 in a point symmetry fashion. As shown in FIG. 23C, the two bass reflex ducts 126 and 127 are located across the two woofers 21 and 22 such that the two bass reflex ducts 126 and 127 are displaced from each other in the upper and lower direction. In these embodiments, since sound waves are radiated from the lateral direction, the two bass reflex ducts 126 and 127 are not supported by the right and left supporting structure composed of the supports 14 and 15 of the stand 10 but by the upper and lower direction supporting structure.

Further, while the two bass reflex ducts 126 and 127 are located around the two woofers 21 and 22 in an axial symmetry fashion or in a point symmetry fashion in the above-described embodiments, the present invention is not limited thereto and it is possible that the speaker apparatus may include one woofer or more than three woofers.

Furthermore, while the example in which the present invention is applied to the flat panel display apparatus as a specific example of electronic equipment has been described so far, the present invention is not limited thereto and it is needless to say that the present invention may be applied to various kinds of electronic equipment insofar as electronic equipment needs a speaker apparatus as in a stereo component, a video projector and the like.

According to the flat panel display apparatus of the present invention, the speaker of the flat panel display main body and the low-pitched sound speaker of the stand are combined together to complete the powerful sound system with the large sound volume. Particularly, according to the present invention, since the stand that supports the flat panel display main body has the low-pitched sound speaker built therein, it is possible to realize the sound system with the large sound volume without requiring an extra space. Further, since this low-pitched sound speaker is located at the optimum position of the back side of the flat panel display main body in the state in which the flat panel display main body is placed on the state, it is possible to easily construct the sound system with the large sound volume without a cumbersome work for selecting the place to install the low-pitched sound speaker. Also, since this low-pitched sound speaker is located at the back side of the flat panel display main body, the outside appearance of the flat panel display apparatus can be made neat and simple on the whole as it is seen from the front.

Further, according to the present invention, since the stand on which the flat panel display main body is placed has supports extended along the back side thereof and the speaker enclosure having the low-pitched sound speaker built therein is supported between the supports, the speaker enclosure can be made large in size to increase its volume, whereby the more powerful sound system with the heavy low-pitched sound can be realized.

Further, according to the flat panel display apparatus of the present invention, since the display main body and the speaker are electrically connected with each other in the state in which the display main body is placed on the state, the display main body and the speaker can be electrically connected with each other without user's cumbersome connection work. In particular, according to the present invention, since the connector of one side is constantly urged against and fitted into the connector of the other side under spring force of the resilient member, the stable connected state can be maintained. As a result, even when the flat panel display apparatus is packed and transported in the state in which the display main body and the stand are combined with each other, the connectors can be prevented from being released from the engagement due to causes such as vibrations in the transportation and hence reliability in the connection can be guaranteed.

Further, according to the present invention, since the connection mistake occurred when the flat panel display main body and the low-pitched sound speaker are not connected with each other correctly is detected and the message indicative of such connection mistake is indicated on the screen of the flat panel display main body, it is possible to avoid a user from continuing to use the flat panel display apparatus without consciousness of the connection mistake and hence the flat panel display apparatus can be used while its original sound performance can be demonstrated sufficiently.

Further, according to the present invention, since the position of the speaker enclosure can be slidably adjusted in response to the size of the flat panel display main body that is placed on the stand, when the external connection cord is connected to the terminal portion at the back side of the flat panel display main body, for example, the external connection cord can be smoothly connected to the terminal portion without being disturbed by the speaker enclosure. Also, the speaker enclosure can be adjusted so as to be located at the optimum position considering sound effects.

Furthermore, according to the speaker apparatus of the present invention, since the opening portion is formed on the plane perpendicular to the plane to which the speaker unit of the speaker enclosure is attached and the bass reflex duct connected to the opening portion is extended in the direction perpendicular to the direction in which sound waves are radiated from the speaker unit, the speaker enclosure can be decreased in thickness and hence it is possible to provide the speaker apparatus suitable for use with electronic equipment such as the flat panel display apparatus of which thickness is very strongly requested to be decreased.

It should be understood by those skilled in the art that various modifications, combinations, sub-combinations and alterations may occur depending on design requirements and other factors insofar as they are within the scope of the appended claims or the equivalents thereof.

The invention claimed is:

1. A flat panel display apparatus, comprising:
a flat panel display main body having a first electrical connector portion, the first electrical connector portion having first electrical contacts;
a stand supporting the flat panel display main body in a supported position, the stand having a speaker built therein and a second electrical connector portion electrically connected to the speaker, the second electrical connector having second electrical contacts; and
a resilient member,
wherein the first and second electrical connectors are removeably connectable with each other to permit engagement and disengagement of the first and second electrical contacts,
and wherein when the first electrical connector portion engages the second electrical portion in the supported position to electrically connect the flat panel display main body to the speaker by contact of the first and second electrical contacts, one of the first and second electrical connector portions is constantly urged against another one of the first and second connecting portions by the resilient member.

2. A flat panel display apparatus according to claim 1, wherein the one of the first and second electrical connector portions is fitted into the another one of the first and second electrical connector portions at an intermediate point at which the one of the first and second electrical connector portions are moveable.

3. A flat panel display apparatus, comprising:
a flat panel display main body including a speaker, a display screen and a first connecting portion;
a resilient member;
a stand supporting the flat panel display main body in a supported position, the stand including a low-pitched sound speaker and a second connecting portion electrically connected to the low-pitched sound speaker, the first connecting portion engaging the second connecting portion in the supported position to electrically connect the flat panel display main body to the low-pitched sound speaker through first engageable electrical contacts of the first connecting portion and second engageable electrical contacts of the second connecting portion, one of the first connecting portion or the second connecting portion being constantly urged against the other one of the first connecting portion or the second connecting portion by the resilient member to engage the first and second electrical contacts; and
detecting means for detecting a connection mistake between the first connecting portion and the second connecting portion, wherein if a connection mistake is detected by the detecting means, a message indicative of the detected connection mistake is indicated on the display screen of the flat panel display main body.

4. A flat panel display apparatus according to claim 3, wherein the detecting means includes a detection connecting terminal in one of the first and second connecting portions, the detecting means being capable of detecting a connection state between the flat panel display main body and the low-pitched sound speaker by detecting whether the detection connecting terminal is energized.

5. A flat panel display apparatus, comprising:
a flat panel display main body; and
a stand supporting the flat panel display main body in a supported position, the stand including an enclosure for a speaker and a vertical slide mechanism for vertically adjusting the position of the enclosure so that the position of the enclosure is variable relative to the position of the flat panel display main body in the supported position.

6. A flat panel display apparatus according to claim 5, wherein the slide mechanism includes tightening screws, the enclosure being fixed in a position by tightening the tightening screws, and being slidable relative to the flat panel display main body by loosening the tightening screws.

7. A flat panel display apparatus according to claim 5, wherein the enclosure is mounted to the stand via a cushion material.

8. A stand for supporting a flat panel display main body in a supported position, the flat panel display main body including a speaker, the stand comprising:
a holder portion positioned below the flat panel display main body in the supported position, the holder portion having first and second ends;
a pair of supports extending from the holder portion adjacent the first and second ends;
a speaker enclosure mounted between the supports, the speaker enclosure including a low-pitched sound speaker; and
a vertical slide mechanism to adjust a vertical position of the speaker enclosure so that the position of the speaker enclosure is variable relative to a position of the flat panel display main body in the supported position.

9. A stand according to claim 8, wherein the flat panel display main body is electrically connected to the low-pitched sound speaker when the flat panel display main body is placed in the supported position.

10. A stand according to claim 8, wherein the speaker enclosure is mounted to the supports via a cushion material.

11. A stand for supporting a flat panel display main body in a supported position, the stand comprising:
an enclosure for a speaker; and
a vertical slide mechanism for adjusting the vertical position of the enclosure so that the position of the enclosure is variable relative to the position of the flat panel display main body in the supported position.

12. A stand according to claim 11, wherein the slide mechanism includes tightening screws, the enclosure being fixed in a position by tightening the tightening screws, and being slidable relative to the flat panel display main body by loosening the tightening screws.

13. A stand according to claim 11, wherein the enclosure is mounted to the stand via a cushion material.

* * * * *